United States Patent
Sussman et al.

(10) Patent No.: US 10,579,064 B2
(45) Date of Patent: Mar. 3, 2020

(54) AUTONOMOUS ROBOT CHARGING PROFILE SELECTION

(71) Applicant: Locus Robotics Corp., Wilmington, MA (US)

(72) Inventors: Michael Sussman, Winchester, MA (US); Aron Klair Insinga, Nashua, NH (US)

(*) Notice: Subject to any disclaimer, the term of this patent is extended or adjusted under 35 U.S.C. 154(b) by 102 days.

(21) Appl. No.: 15/712,441

(22) Filed: Sep. 22, 2017

(65) Prior Publication Data

US 2019/0092183 A1    Mar. 28, 2019

(51) Int. Cl.
| | |
|---|---|
| *H02J 7/00* | (2006.01) |
| *G05D 1/02* | (2020.01) |
| *B60L 53/14* | (2019.01) |
| *B60L 53/65* | (2019.01) |
| *B60L 58/13* | (2019.01) |
| *G05D 1/00* | (2006.01) |

(52) U.S. Cl.
CPC ............ *G05D 1/0225* (2013.01); *B60L 53/14* (2019.02); *B60L 53/65* (2019.02); *B60L 58/13* (2019.02); *G05D 1/0088* (2013.01); *B60L 2230/16* (2013.01); *B60L 2240/547* (2013.01); *B60L 2240/549* (2013.01)

(58) Field of Classification Search
USPC ...................................................... 320/109
See application file for complete search history.

(56) References Cited

U.S. PATENT DOCUMENTS

| | | |
|---|---|---|
| 3,703,621 A | 11/1972 | Viola et al. |
| 6,389,329 B1 | 5/2002 | Colens |
| 6,764,373 B1* | 7/2004 | Osawa .................. B25J 19/005 |
| | | 180/169 |
| 7,430,462 B2 | 9/2008 | Chiu et al. |
| 7,706,917 B1 | 4/2010 | Chiappetta |
| 7,708,578 B1 | 5/2010 | Lenox |

(Continued)

FOREIGN PATENT DOCUMENTS

| | | |
|---|---|---|
| EP | 1632319 A1 | 3/2006 |
| EP | 2617531 A1 | 7/2013 |

(Continued)

OTHER PUBLICATIONS

International Search Report with Written Opinion, dated Jul. 24, 2017, received in international patent application No. PCT/US2017/025649, 12 pages.

(Continued)

*Primary Examiner* — Samuel Berhanu
(74) *Attorney, Agent, or Firm* — Verrill; John W. Powell

(57) ABSTRACT

An electrical charging station for charging an autonomous robot having a battery. The charging station includes a first charging member configured to receive a second charging member on the autonomous robot when the autonomous robot is docked with the charging station. There is a communications device configured to receive from the autonomous robot an identifier indicative of a type of battery on the autonomous robot. There is a power supply, electrically connected to the first charging member, configured to charge the autonomous robot according to a charging profile. The charging profile is selected based at least in part on the identifier received from the autonomous robot.

21 Claims, 26 Drawing Sheets

(56) References Cited

U.S. PATENT DOCUMENTS

| | | | |
|---|---|---|---|
| 7,729,801 B2 | 6/2010 | Abramson | |
| 8,010,229 B2 | 8/2011 | Kim et al. | |
| 8,352,114 B2 | 1/2013 | More et al. | |
| 8,390,251 B2 | 3/2013 | Cohen et al. | |
| 8,439,698 B1 | 5/2013 | Saini et al. | |
| 8,452,450 B2 | 5/2013 | Dooley et al. | |
| 8,461,803 B2 | 6/2013 | Cohen | |
| 8,476,867 B2 | 7/2013 | Li et al. | |
| 8,823,324 B2 * | 9/2014 | Brandon, II | H02J 7/0003 320/107 |
| 8,854,001 B2 | 10/2014 | Cohen et al. | |
| D721,650 S | 1/2015 | Fauchet et al. | |
| 9,082,112 B2 * | 7/2015 | Sullivan | G06Q 20/105 |
| 9,178,370 B2 | 11/2015 | Henricksen et al. | |
| 9,203,184 B1 | 12/2015 | Hui | |
| 9,229,454 B1 | 6/2016 | Chiappetta et al. | |
| 9,463,927 B1 | 10/2016 | Theobald | |
| 2004/0158357 A1 | 8/2004 | Lee | |
| 2005/0113972 A1 | 5/2005 | Kumhyr | |
| 2008/0109114 A1 | 5/2008 | Orita | |
| 2008/0183349 A1 * | 7/2008 | Abramson | A01D 34/008 701/23 |
| 2010/0286823 A1 | 11/2010 | Neki | |
| 2010/0296908 A1 | 11/2010 | Ko | |
| 2011/0006603 A1 | 1/2011 | Robinson | |
| 2011/0200420 A1 | 8/2011 | Driskill et al. | |
| 2012/0022688 A1 | 1/2012 | Wong | |
| 2012/0049798 A1 | 3/2012 | Cohen et al. | |
| 2012/0086389 A1 | 4/2012 | Li | |
| 2012/0119575 A1 | 5/2012 | Kurs | |
| 2012/0169284 A1 | 7/2012 | Park | |
| 2012/0253655 A1 | 10/2012 | Yamada | |
| 2012/0330458 A1 | 12/2012 | Weiss | |
| 2013/0317642 A1 | 11/2013 | Asaria et al. | |
| 2014/0277691 A1 | 9/2014 | Jacobus et al. | |
| 2014/0354213 A1 | 12/2014 | Rivera-Poventud | |
| 2014/0360832 A1 | 12/2014 | Aldrich | |
| 2016/0075021 A1 | 3/2016 | Cohen et al. | |
| 2016/0091899 A1 | 3/2016 | Aldred | |
| 2016/0218523 A1 * | 7/2016 | Curtis | H02J 7/0004 |
| 2017/0072564 A1 | 3/2017 | Cohen et al. | |
| 2018/0370377 A1 | 12/2018 | Blacksberg et al. | |

FOREIGN PATENT DOCUMENTS

| | | |
|---|---|---|
| GB | 2253151 A | 2/2001 |
| JP | 2006231448 A | 9/2006 |
| WO | 2014/115209 A1 | 7/2014 |
| WO | 2017/066680 A1 | 4/2017 |

OTHER PUBLICATIONS

International Search Report and Written Opinion, dated Feb. 12, 2019, received in international patent application No. PCT/US2018/052236, 13 pages.

International Search Report and Written Opinion, dated Jan. 11, 2019, received in international patent application No. PCT/US2018/052229, 9 pages.

* cited by examiner

| Fiducial ID | x | y | z | quaternion.x | quaternion.y | quaternion.z | quaternion.w |
|---|---|---|---|---|---|---|---|
| 1 | -10.2 | 2.3 | 0 | 0 | 0 | 0 | 1 |
| 2 | 23.1 | 15.8 | 0 | 0 | 0 | 0 | 1 |
| 3 | 45.3 | 3.3 | 0 | 0 | 0 | -1 | 0 |

| Location | Fiducial ID |
|---|---|
| L01001A | 11 |
| L01001B | 11 |
| L01001C | 11 |
| L01001D | 11 |
| L01001E | 11 |
| L01001F | 11 |
| L01002A | 12 |
| L01002B | 12 |
| L01002C | 12 |
| L01002D | 12 |
| L01002E | 12 |
| L01003A | 13 |
| L01003B | 13 |
| L01003C | 13 |
| L01003D | 13 |
| L01003E | 13 |
| L01003F | 13 |
| L01004A | 14 |
| L01004B | 14 |
| L01004C | 14 |
| L01004D | 14 |
| L01004E | 14 |
| L01005A | 15 |
| L01005B | 15 |
| L01005C | 15 |
| L01005D | 15 |
| L01005E | 15 |
| L01005F | 15 |

FIG. 7

AUTONOMOUS ROBOT CHARGING PROFILE SELECTION

FIELD OF THE INVENTION

This invention relates to an electrical charging system and more particularly to such a system which automatically selects a charging profile for an autonomous robot.

BACKGROUND OF THE INVENTION

In many applications, robots are used to perform functions in place of humans or to assist humans in order to increase productivity and efficiency. One such application is order fulfillment, which is typically performed in a large warehouse filled with products to be shipped to customers who have placed their orders over the internet for home delivery.

Fulfilling such orders in a timely, accurate and efficient manner is logistically challenging to say the least. Clicking the "check out" button in a virtual shopping cart creates an "order." The order includes a listing of items that are to be shipped to a particular address. The process of "fulfillment" involves physically taking or "picking" these items from a large warehouse, packing them, and shipping them to the designated address. An important goal of the order-fulfillment process is thus to ship as many items in as short a time as possible. In addition, the products that will ultimately be shipped first need to be received in the warehouse and stored or "placed" in storage bins in an orderly fashion throughout the warehouse so they can be readily retrieved for shipping.

Using robots to perform picking and placing functions may be done by the robot alone or with the assistance of human operators. The robots are powered by electricity, which is stored in batteries onboard the robot. With all of the travelling that the robots do around the warehouse they must be regularly recharged. Therefore, for the operation to run smoothly, an efficient and effective way to charge the robots is a requirement.

BRIEF SUMMARY OF THE INVENTION

The benefits and advantages of the present invention over existing systems will be readily apparent from the Brief Summary of the Invention and Detailed Description to follow. One skilled in the art will appreciate that the present teachings can be practiced with embodiments other than those summarized or disclosed below.

In one aspect, the invention includes an electrical charging station for charging an autonomous robot having a battery. There is a first charging member on the electrical charging station configured to receive a second charging member on the autonomous robot when the autonomous robot is docked with the charging station for charging. There is a communications device configured to receive from the autonomous robot an identifier indicative of a type of battery on the autonomous robot. There is also a power supply, electrically connected to the first charging member, configured to charge the autonomous robot according to a charging profile. The charging profile is selected based at least in part on the identifier received from the autonomous robot.

In other aspects of the invention, one or more of the following features may be included. The identifier may comprise one or more of a battery type, an autonomous robot type, or battery condition. The battery condition may include a battery temperature and for a certain battery type the charging profile for a normal battery temperature range may be different than the charging profile for either a battery temperature above the normal temperature range or below the normal temperature range. The charging station may include a memory for storing a plurality of charging profiles, at least one of which corresponds to the identifier. The communications device may include a transceiver for communicating with a corresponding transceiver on the autonomous robot. The transceiver of the charging station and the corresponding transceiver on the autonomous robot may be optical transceivers and may communicate using an IrDA communications protocol. There may further be included a current sensor configured to sense a current output from the power supply to the autonomous robot and a voltage sensor configured to sense a voltage across the first charging member applied by the power supply. There may also be included a processor configured to control the power supply to charge the autonomous robot according to the charging profile and the charging profile may include a constant current portion and a constant voltage portion. The processor may be configured to charge the robot in the constant current charging portion of the charging profile using a constant current until a predetermined voltage level is reached and to then charge the robot in the constant voltage portion of the charging profile using a constant voltage. During the constant voltage charging portion of the charging profile the processor may be configured to provide the SOC to the robot and terminate charging when a SOC request from the robot has been received indicating an upper battery voltage threshold has been reached or when a predetermined current level is being output by the power supply, in both cases indicating a fully charged battery. The processor may be configured to control the power supply after the robot is fully charged but before the robot has undocked from the charging station to charge the robot using a float charging profile which provides a limited charge level to the robot by maintaining a constant voltage level until the robot is undocked. The processor may be configured to charge the robot in a dead battery state using a recovery profile having a constant current portion and a constant voltage portion and the processor may be further configured to prompt a user to start the robot upon completion of the recovery charging profile so that communication between the robot and the charging station can be established to complete robot charging using a charging profile selected based at least in part on the identifier received from the autonomous robot.

In another aspect, the invention includes a method for charging an autonomous robot having a battery. The method includes docking an autonomous robot by mating a first charging member on an electrical charging station with a second charging member on the autonomous robot. The method also includes receiving a communication from the autonomous robot having an identifier indicative of a type of battery on the autonomous robot. The method further includes charging, using a power supply, the autonomous robot according to a charging profile. The charging profile is selected based at least in part on the identifier received from the autonomous robot.

In yet other aspects of the invention, one or more of the following features may be included The identifier may comprise one or more of a battery type, an autonomous robot type, or battery condition. The battery condition may include a battery temperature and for a certain battery type the charging profile for a normal battery temperature range may be different than the charging profile for either a battery temperature above the normal temperature range or below the normal temperature range. The method may further include storing in a memory in the charging station a plurality of charging profiles, at least one of which corresponds to the identifier. The receiving step may include communicating with optical transceivers one on each of the autonomous robot and on the charging station and it may include using an IrDA communications protocol. The method may further include sensing a current output from the power supply to the autonomous robot using a current sensor and sensing a voltage across the first charging member applied by the power supply using a voltage sensor. The method may also include controlling the power supply to charge the autonomous robot according to the charging profile and the charging profile may include a constant current portion and a constant voltage portion. The method may further include charging the robot in the constant current charging portion of the charging profile using a constant current until a predetermined voltage level is reached and charging the robot in the constant voltage portion of the charging profile using a constant voltage until a predetermined current level is reached. During the constant voltage charging portion of the charging profile the method may include providing the SOC to the robot and terminating charging when a SOC request from the robot has been received indicating an upper battery voltage threshold has been reached or when a predetermined current level is being output by the power supply, in both cases indicating a fully charged battery. The method may include controlling the power supply after the robot is fully charged but before the robot has undocked from the charging station to charge the robot using a float charging profile which provides a limited charge level to the robot by maintaining a constant voltage level until the robot is undocked. The method may additionally include charging the robot in a dead battery state using a recovery profile having a constant current portion and a constant voltage portion, and prompting a user to start the robot upon completion of the recovery charging profile so that communication between the robot and the charging station can be established to complete robot charging using a charging profile selected based at least in part on the identifier received from the autonomous robot.

These and other features of the invention will be apparent from the following detailed description and the accompanying figures.

BRIEF DESCRIPTION OF THE FIGURES

Embodiments of the present invention will now be described, by way of example only, with reference to the attached Figures, wherein:

FIG. 6 is a table of the fiducial identification to pose mapping;

FIG. 7 is a table of the bin location to fiducial identification mapping;

DETAILED DESCRIPTION OF THE INVENTION

Figure 1:
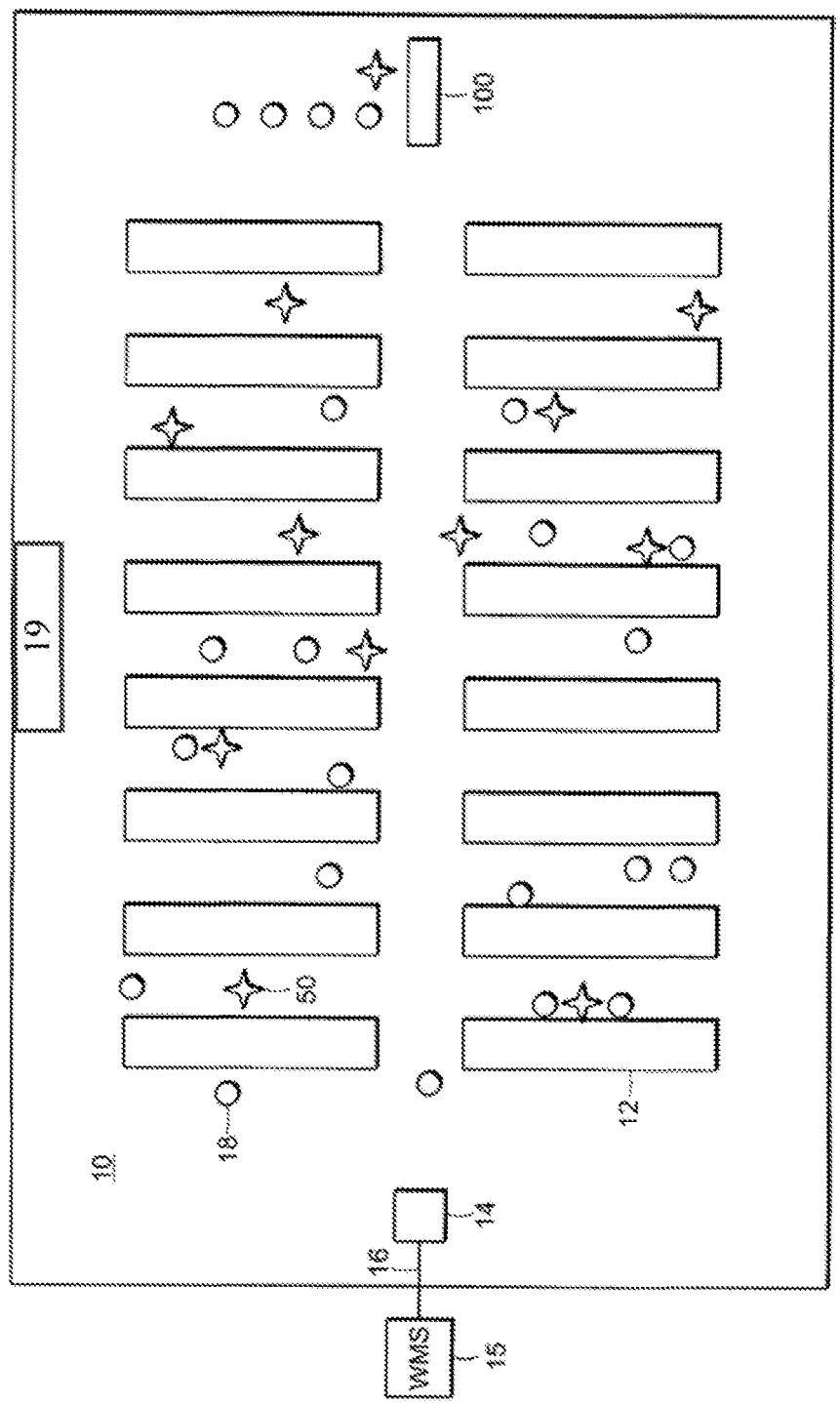
FIG. 1 is a top plan view of an order-fulfillment warehouse.

The disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the several views of the drawings.

The invention is directed to an electrical charging system for use in charging robots. Although not restricted to any particular robot application, one suitable application that the invention may be used in is order fulfillment. The use of robots in this application will be described to provide context for the electrical charging system.

While the description provided herein is focused on picking items from bin locations in the warehouse to fulfill an order for shipment to a customer, the system is equally applicable to the storage or placing of items received into the warehouse in bin locations throughout the warehouse for later retrieval and shipment to a customer. The invention is also applicable to inventory control tasks associated with such a warehouse system, such as, consolidation, counting, verification, inspection and clean-up of products.

Referring to FIG. 1, a typical order-fulfillment warehouse 10 includes shelves 12 filled with the various items that could be included in an order 16. In operation, the order 16 from warehouse management server 15 arrives at an order-server 14. The order-server 14 communicates the order 16 to a robot 18 selected from a plurality of robots that roam the warehouse 10. Also shown is charging area 19, which is where one or more charging stations according to an aspect of the invention may be located.

Figure 2A:
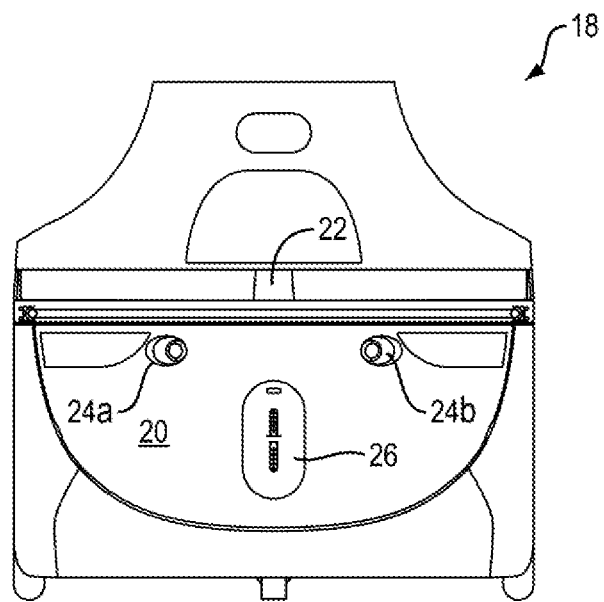
FIG. 2A is a front elevational view of a base of one of the robots used in the warehouse shown in FIG. 1.
Figure 2B:
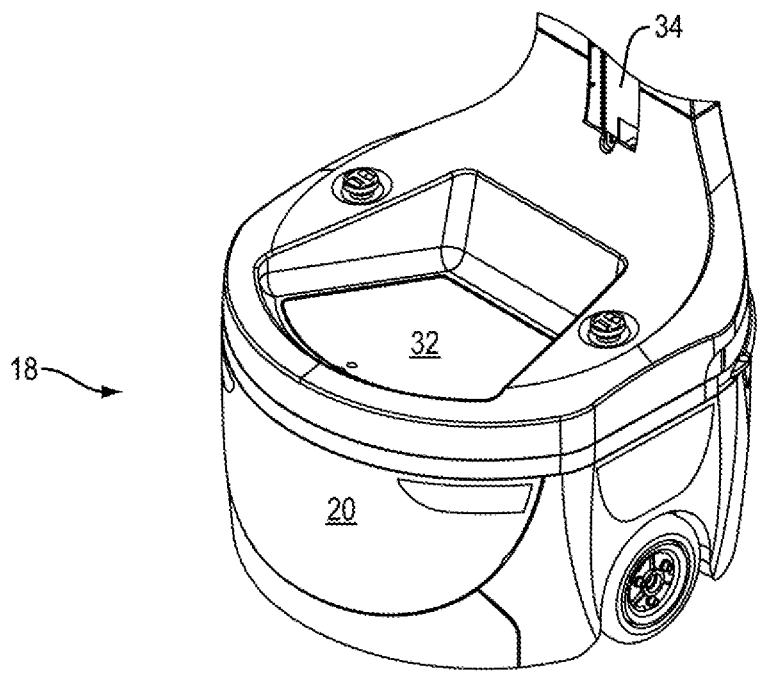
FIG. 2B is a perspective view of a base of one of the robots used in the warehouse shown in FIG. 1.
Figure 3:
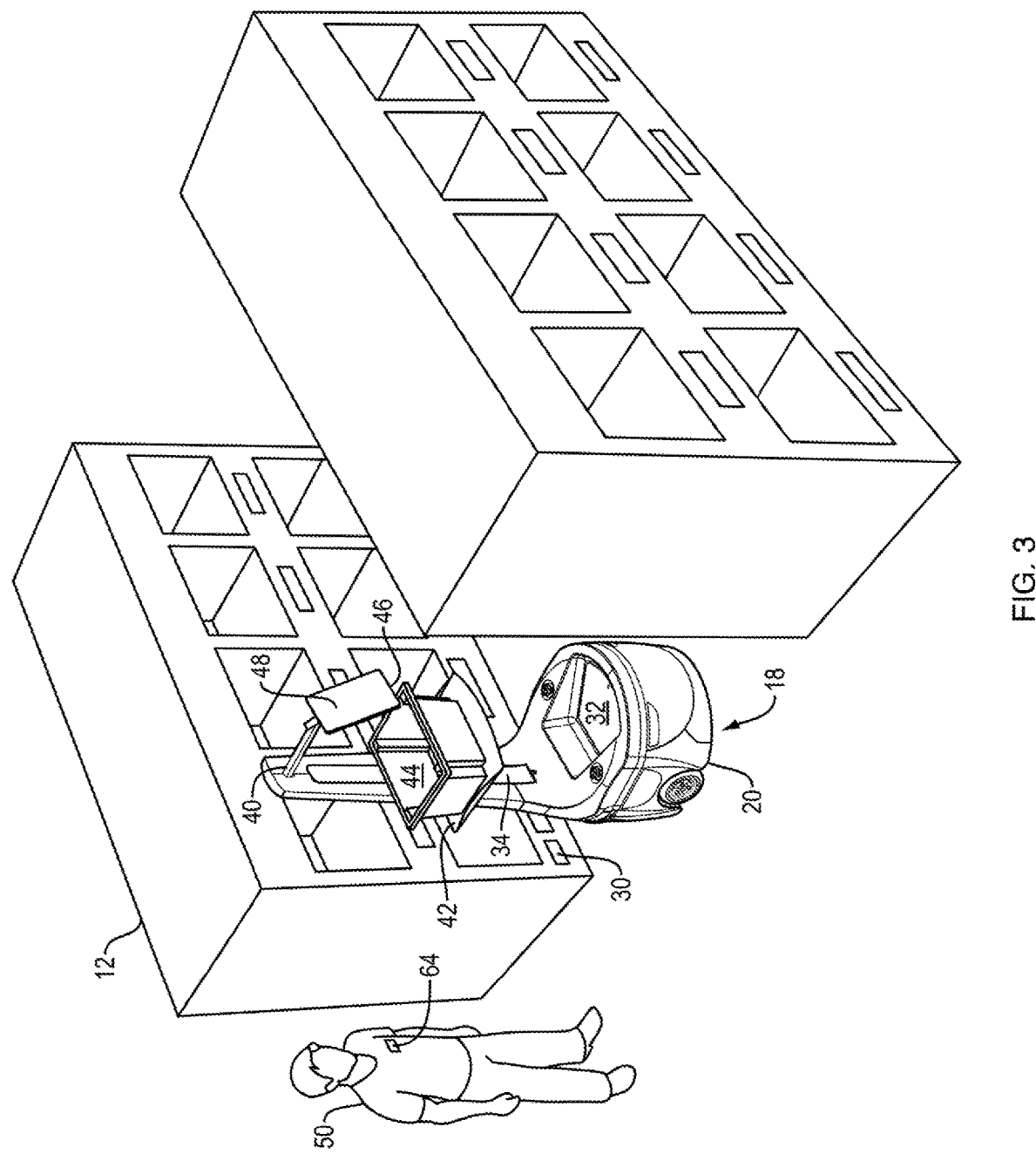
FIG. 3 is a perspective view of the robot in FIGS. 2A and 2B outfitted with an armature and parked in front of a shelf shown in FIG. 1.

In a preferred embodiment, a robot 18, shown in FIGS. 2A and 2B, includes an autonomous wheeled base 20 having a laser-radar 22. The base 20 also features a transceiver (not shown) that enables the robot 18 to receive instructions from the order-server 14, and a pair of digital optical cameras 24a and 24b. The robot base also includes an electrical charging port 26 (depicted in more detail in FIGS. 10 and 11) for re-charging the batteries which power autonomous wheeled base 20. The base 20 further features a processor (not shown) that receives data from the laser-radar and cameras 24a and 24b to capture information representative of the robot's environment. There is a memory (not shown) that operates with the processor to carry out various tasks associated with navigation within the warehouse 10, as well as to navigate to fiducial marker 30 placed on shelves 12, as shown in FIG. 3. Fiducial marker 30 (e.g. a two-dimensional bar code) corresponds to bin/location of an item ordered. The navigation approach of this invention is described in detail below with respect to FIGS. 4-8. Fiducial markers are also used to identify charging stations according to an aspect of this invention and the navigation to such charging station fiducial markers is the same as the navigation to the bin/location of items ordered. Once the robots navigate to a charging station, a more precise navigation approach is used to dock the robot with the charging station and such a navigation approach is described below.

Referring again to FIG. 2B, base 20 includes an upper surface 32 where a tote or bin could be stored to carry items. There is also shown a coupling 34 that engages any one of a plurality of interchangeable armatures 40, one of which is shown in FIG. 3. The particular armature 40 in FIG. 3 features a tote-holder 42 (in this case a shelf) for carrying a tote 44 that receives items, and a tablet holder 46 (or laptop/other user input device) for supporting a tablet 48. In some embodiments, the armature 40 supports one or more totes for carrying items. In other embodiments, the base 20 supports one or more totes for carrying received items. As used herein, the term "tote" includes, without limitation, cargo holders, bins, cages, shelves, rods from which items can be hung, caddies, crates, racks, stands, trestle, containers, boxes, canisters, vessels, and repositories.

Although a robot 18 excels at moving around the warehouse 10, with current robot technology, it is not very good at quickly and efficiently picking items from a shelf and placing them in the tote 44 due to the technical difficulties associated with robotic manipulation of objects. A more efficient way of picking items is to use a local operator 50, which is typically human, to carry out the task of physically removing an ordered item from a shelf 12 and placing it on robot 18, for example, in tote 44. The robot 18 communicates the order to the local operator 50 via the tablet 48 (or laptop/other user input device), which the local operator 50 can read, or by transmitting the order to a handheld device used by the local operator 50.

Upon receiving an order 16 from the order server 14, the robot 18 proceeds to a first warehouse location, e.g. as shown in FIG. 3. It does so based on navigation software stored in the memory and carried out by the processor. The navigation software relies on data concerning the environment, as collected by the laser-radar 22, an internal table in memory that identifies the fiducial identification ("ID") of fiducial marker 30 that corresponds to a location in the warehouse 10 where a particular item can be found, and the cameras 24a and 24b to navigate.

Upon reaching the correct location, the robot 18 parks itself in front of a shelf 12 on which the item is stored and waits for a local operator 50 to retrieve the item from the shelf 12 and place it in tote 44. If robot 18 has other items to retrieve it proceeds to those locations. The item(s) retrieved by robot 18 are then delivered to a packing station 100, FIG. 1, where they are packed and shipped.

It will be understood by those skilled in the art that each robot may be fulfilling one or more orders and each order may consist of one or more items. Typically, some form of route optimization software would be included to increase efficiency, but this is beyond the scope of this invention and is therefore not described herein.

In order to simplify the description of the invention, a single robot 18 and operator 50 are described. However, as is evident from FIG. 1, a typical fulfillment operation includes many robots and operators working among each other in the warehouse to fill a continuous stream of orders.

The navigation approach of this invention, as well as the semantic mapping of a SKU of an item to be retrieved to a fiducial ID/pose associated with a fiducial marker in the warehouse where the item is located, is described in detail below with respect to FIGS. 4-8. As noted above, the same navigation approach may be used to enable the robot to navigate to a charging station in order to recharge its battery.

Using one or more robots 18, a map of the warehouse 10 must be created and dynamically updated to determine the location of objects, both static and dynamic, as well as the locations of various fiducial markers dispersed throughout the warehouse. To do this, one of the robots 18 navigate the warehouse and build/update a map 10a, FIG. 4, utilizing its laser-radar 22 and simultaneous localization and mapping (SLAM), which is a computational method of constructing or updating a virtual map of an unknown environment. Popular SLAM approximate solution methods include the particle filter and extended Kalman filter. The SLAM GMapping approach is the preferred approach, but any suitable SLAM approach can be used.

Robot 18 utilizes its laser-radar 22 to create/update map 10a of warehouse 10 as robot 18 travels throughout the space identifying open space 112, walls 114, objects 116, and other static obstacles such as shelves 12a in the space, based on the reflections it receives as the laser-radar scans the environment.

Figure 4:
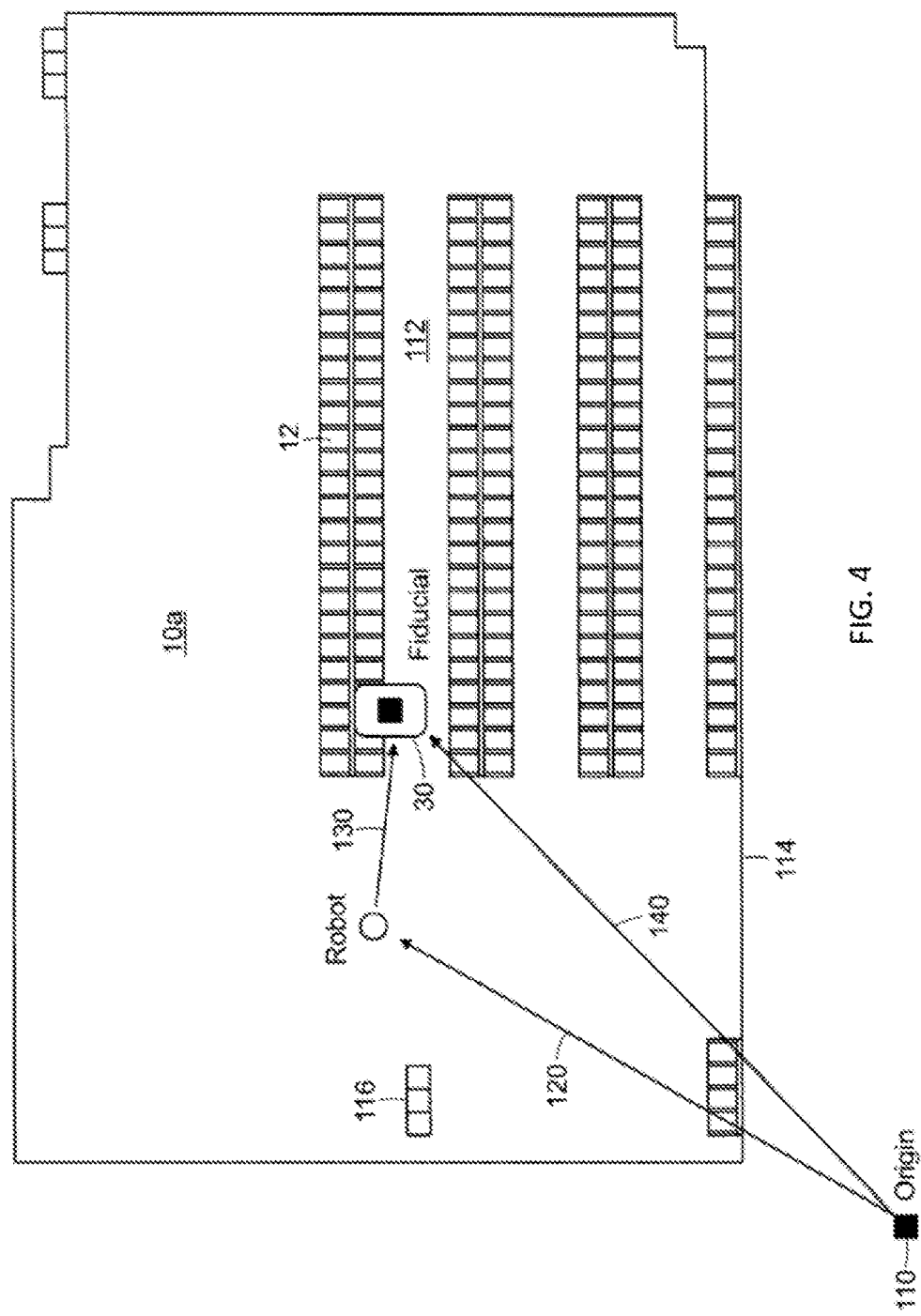
FIG. 4 is a partial map of the warehouse of FIG. 1 created using laser radar on the robot.

While constructing the map 10a or thereafter, one or more robots 18 navigates through warehouse 10 using cameras 24a and 24b to scan the environment to locate fiducial markers (two-dimensional bar codes) dispersed throughout the warehouse on shelves proximate bins, such as 32 and 34, FIG. 3, in which items are stored. Robots 18 use a known reference point or origin for reference, such as origin 110. When a fiducial marker, such as fiducial marker 30, FIGS. 3 and 4, is located by robot 18 using its cameras 24a and 24b, the location in the warehouse relative to origin 110 is determined. By using two cameras, one on either side of robot base, as shown in FIG. 2A, the robot 18 can have a relatively wide field of view (e.g. 120 degrees) extending out from both sides of the robot. This enables the robot to see, for example, fiducial markers on both sides of it as it travels up and down aisles of shelving.

By the use of wheel encoders and heading sensors, vector 120, and the robot's position in the warehouse 10 can be determined. Using the captured image of a fiducial marker/two-dimensional barcode and its known size, robot 18 can determine the orientation with respect to and distance from the robot of the fiducial marker/two-dimensional barcode, vector 130. With vectors 120 and 130 known, vector 140, between origin 110 and fiducial marker 30, can be determined. From vector 140 and the determined orientation of the fiducial marker/two-dimensional barcode relative to robot 18, the pose (position and orientation) defined by a quaternion (x, y, z, ω) for fiducial marker 30 can be determined.

Figure 5:
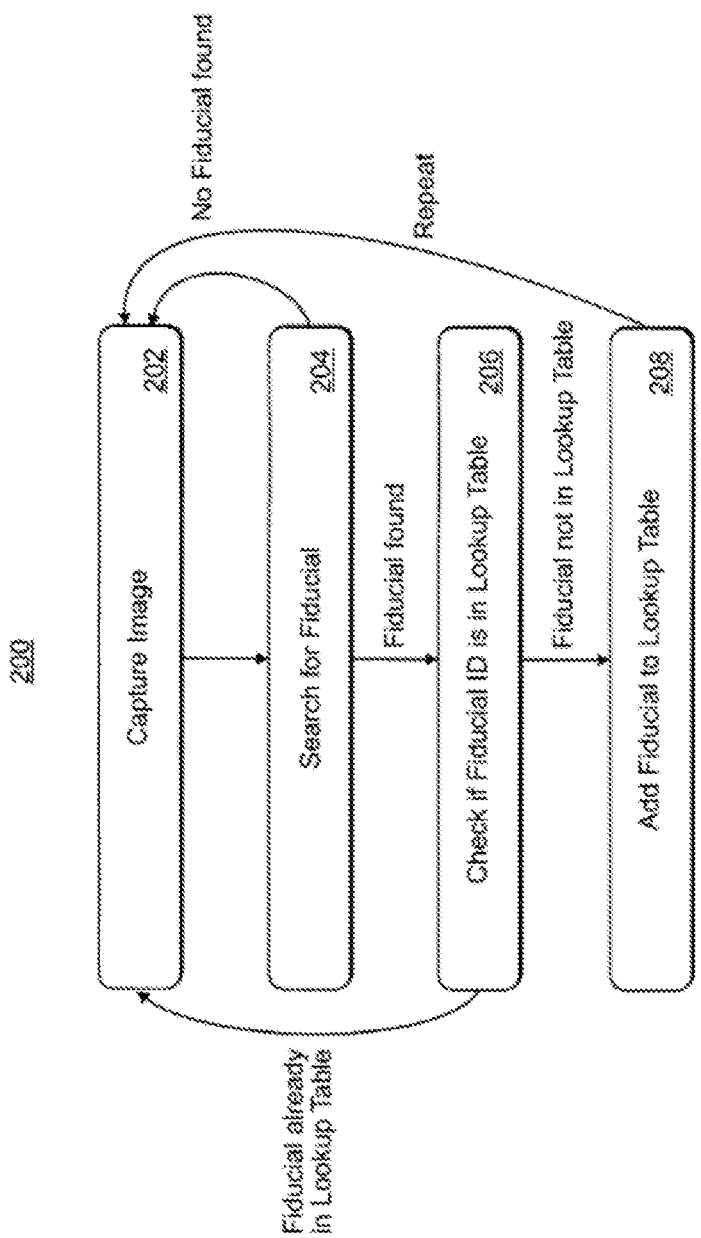
FIG. 5 is a flow chart depicting the process for locating fiducial markers dispersed throughout the warehouse and storing fiducial marker poses.

Flow chart 200, FIG. 5, describing the fiducial marker location process is described. This is performed in an initial mapping mode and as robot 18 encounters new fiducial markers in the warehouse while performing picking, placing and/or other tasks. In step 202, robot 18 using cameras 24a and 24b captures an image and in step 204 searches for fiducial markers within the captured images. In step 206, if a fiducial marker is found in the image (step 204) it is determined if the fiducial marker is already stored in fiducial table 300, FIG. 6, which is located in memory 34 of robot 18. If the fiducial information is stored in memory already, the flow chart returns to step 202 to capture another image. If it is not in memory, the pose is determined according to the process described above and in step 208, it is added to fiducial to pose lookup table 300.

In look-up table 300, which may be stored in the memory of each robot, there are included for each fiducial marker a fiducial identification, 1, 2, 3, etc., and a pose for the fiducial marker/bar code associated with each fiducial identification. The pose consists of the x,y,z coordinates in the warehouse along with the orientation or the quaternion (x,y,z, ω).

In another look-up Table 400, FIG. 7, which may also be stored in the memory of each robot, is a listing of bin locations (e.g. 402a-f) within warehouse 10, which are correlated to particular fiducial ID's 404, e.g. number "11". The bin locations, in this example, consist of seven alpha-numeric characters. The first six characters (e.g. L01001) pertain to the shelf location within the warehouse and the last character (e.g. A-F) identifies the particular bin at the shelf location. In this example, there are six different bin locations associated with fiducial ID "11". There may be one or more bins associated with each fiducial ID/marker. Charging stations located in charging area 19, FIG. 1, may also be stored in table 400 and correlated to fiducial IDs. From the fiducial IDs, the pose of the charging station may be found in table 300, FIG. 6.

The alpha-numeric bin locations are understandable to humans, e.g. operator 50, FIG. 3, as corresponding to a physical location in the warehouse 10 where items are stored. However, they do not have meaning to robot 18. By mapping the locations to fiducial ID's, robot 18 can determine the pose of the fiducial ID using the information in table 300, FIG. 6, and then navigate to the pose as described herein.

Figure 8:
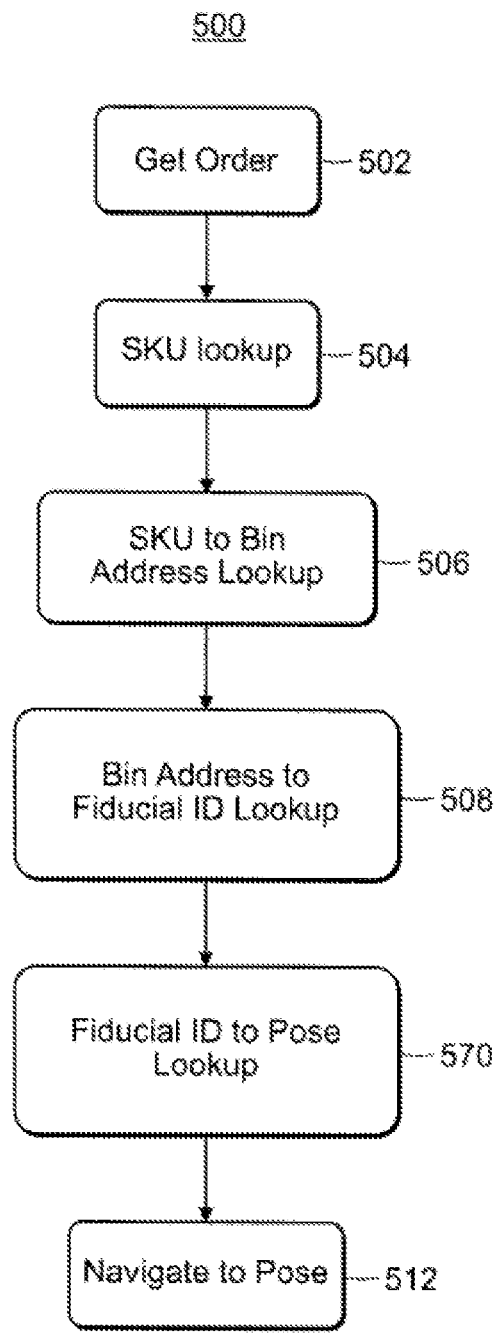
FIG. 8 is a flow chart depicting product SKU to pose mapping process.

The order fulfillment process according to this invention is depicted in flow chart 500, FIG. 8. In step 502, warehouse management system 15, FIG. 1, obtains an order, which may consist of one or more items to be retrieved. In step 504 the SKU number(s) of the items is/are determined by the warehouse management system 15, and from the SKU number(s), the bin location(s) is/are determined in step 506. A list of bin locations for the order is then transmitted to robot 18. In step 508, robot 18 correlates the bin locations to fiducial ID's and from the fiducial s, the pose of each fiducial ID is obtained in step 510. In step 512 the robot 18 navigates to the pose as shown in FIG. 3, where an operator can pick the item to be retrieved from the appropriate bin and place it on the robot.

Item specific information, such as SKU number and bin location, obtained by the warehouse management system 15, can be transmitted to tablet 48 on robot 18 so that the operator 50 can be informed of the particular items to be retrieved when the robot arrives at each fiducial marker location.

With the SLAM map and the pose of the fiducial ID's known, robot 18 can readily navigate to any one of the fiducial ID's using various robot navigation techniques. The preferred approach involves setting an initial route to the fiducial marker pose given the knowledge of the open space 112 in the warehouse 10 and the walls 114, shelves (such as shelf 12) and other obstacles 116. As the robot begins to traverse the warehouse using its laser radar 22, it determines if there are any obstacles in its path, either fixed or dynamic, such as other robots 18 and/or operators 50, and iteratively updates its path to the pose of the fiducial marker. The robot re-plans its route about once every 50 milliseconds, constantly searching for the most efficient and effective path while avoiding obstacles.

Generally, localization of the robot within warehouse 10a is achieved by many-to-many multiresolution scan matching (M3RSM) operating on the SLAM virtual map. Compared to brute force methods, M3RSM dramatically reduces the computational time for a robot to perform SLAM loop closure and scan matching, two critical steps in determining robot pose and position. Robot localization is further improved by minimizing the M3 SRM search space according to methods disclosed in related U.S. application Ser. No. 15/712,222, entitled MULTI-RESOLUTION SCAN MATCHING WITH EXCLUSION ZONES, filed on Sep. 22, 2017, and incorporated by reference in its entirety herein.

With the product SKU/fiducial ID to fiducial pose mapping technique combined with the SLAM navigation technique both described herein, robots 18 are able to very efficiently and effectively navigate the warehouse space without having to use more complex navigation approaches typically used which involve grid lines and intermediate fiducial markers to determine location within the warehouse.

Generally, navigation in the presence of other robots and moving obstacles in the warehouse is achieved by collision avoidance methods including the dynamic window approach (DWA) and optimal reciprocal collision avoidance (ORCA). DWA computes among feasible robot motion trajectories an incremental movement that avoids collisions with obstacles and favors the desired path to the target fiducial marker.

ORCA optimally avoids collisions with other moving robots without requiring communication with the other robot(s). Navigation proceeds as a series of incremental movements along trajectories computed at the approximately 50 ms update intervals. Collision avoidance may be further improved by techniques described in related U.S. application Ser. No. 15/12,256 entitled DYNAMIC WINDOW APPROACH USING OPTIMAL RECIPROCAL COLLISION AVOIDANCE COST-CRITIC, filed on Sep. 22, 2017 and incorporated by reference in its entirety herein.

As described above, robots 50 need to be periodically re-charged. In addition to marking locations in the warehouse where items are stored, a fiducial marker may be placed at one or more electrical charging station(s) within the warehouse. When robot 18 is low on power it can navigate to a fiducial marker located at an electrical charging station so it can be recharged. Once there it can be manually recharged by having an operator connect the robot to the electrical charging system or the robot can use its navigation to dock itself at the electrical charging station.

Figure 9:
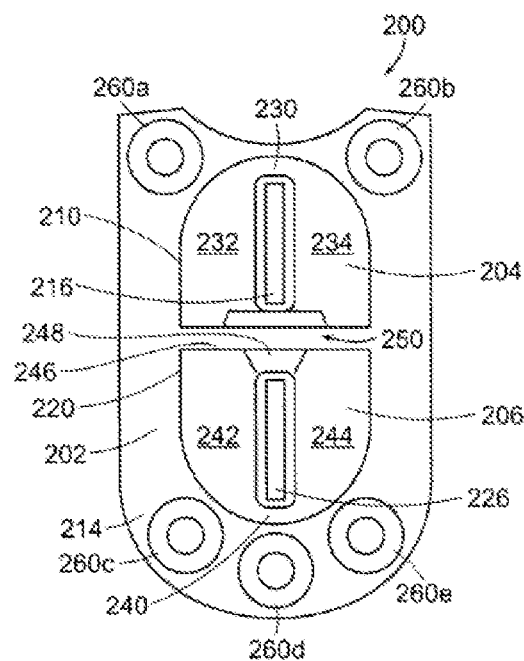
FIG. 9 is a front view of an electrical charging assembly according to this invention.
Figure 10:
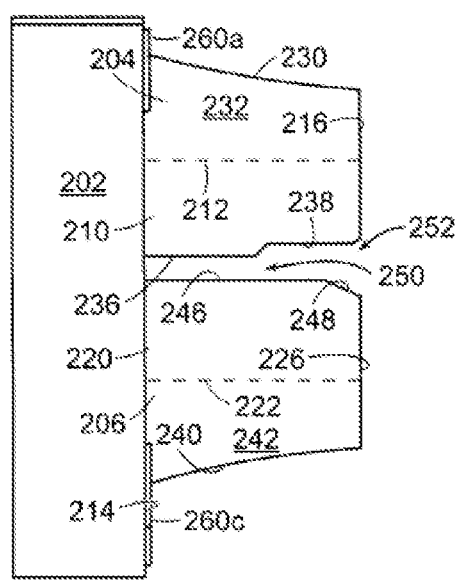
FIG. 10 is a side elevational view of the electrical charging assembly of FIG. 9.

As shown in FIGS. 9 and 10, electrical charging assembly 200 may be used at an electrical charging station. Electrical charging assembly 200 includes charger base 202 on which are disposed a first male terminal member 204 and a second male terminal member 206. Although not shown in this figure, a positive electrical input from the electrical service in the warehouse would be affixed to charger base 202 and electrically connected to one of the first male terminal member 204 or the second male terminal member 206. Also, a negative electrical input would be affixed to charger base 202 and electrically connected to the other of the first male terminal member 204 or the second male terminal member 206.

First male terminal member 204 has first base 210 affixed to and extending orthogonally along a first axis 212 from surface 214 of the charger base 202 and terminates in a first electrical contact 216. First electrical contact 216 may be in the form of a copper bus bar which extends into charger base 202 to which would be affixed one of the positive or negative electrical connections. Second male terminal member 206 has second base 220 affixed to and extending orthogonally along a second axis 222 from surface 214 of the charger base 202 and terminates in a second electrical contact 226. Second electrical contact 226 may also be in the form of a copper bus bar which extends into charger base 202 to which would be affixed the other of the positive or negative electrical connections.

The first male terminal member 204 has a plurality of external surfaces at least two of which have a curved shape from the first base 210 to the first electrical contact 216 forming a concave surface. In the embodiment depicted in FIGS. 9 and 10 there are three curved surfaces; namely, top curved surface 230 and opposing side curved surfaces 232 and 234, the three of which curve from first base 210 to first electrical contact 216, with particular radii of curvature, forming concave surfaces. In this embodiment, the radius of curvature of opposing side curved surfaces 232 and 234 is approximately 63.9 mm. The radius of curvature of top curved surface 230 is approximately 218.7 mm. These were determined empirically to provide for optimized alignment correction. More misalignment is expected in the horizontal direction as compared to the vertical direction; therefore, the opposing side curved surfaces are provided with a smaller radius of curvature. Of course, the radii of curvature of the curved surfaces may be varied depending on the application.

In addition, first male terminal member 204 has a flat surface 236 which is substantially parallel to first axis 212 and orthogonal to surface 214 of charger base 202. Flat surface 236 includes a recessed surface portion 238 proximate first electrical contact 216.

The second male terminal member 206 has a plurality of external surfaces at least two of which have a curved shape from the second base 220 to the second electrical contact 226, forming a concave surface. In the embodiment depicted in FIGS. 9 and 10 there are three curved surfaces; namely, bottom curved surface 240 and opposing side curved surfaces 242 and 244, the three of which curve from first base 220 to first electrical contact 226, with particular radii of curvature, forming concave surfaces. In this embodiment, the radius of curvature of opposing side curved surfaces 242 and 244 is approximately 63.9 mm. The radius of curvature of bottom curved surface 240 is approximately 218.7 mm. These were determined empirically to provide for optimized alignment correction. More misalignment is expected in the horizontal direction as compared to the vertical direction; therefore, the opposing side curved surfaces are provided with a smaller radius of curvature. Of course, the radii of curvature of the curved surfaces may be varied depending on the application.

In addition, second male terminal member 206 has a flat surface 246, which is substantially parallel to second axis 222 and orthogonal to surface 214 of charger base 202. Flat surface 246 includes a flared surface portion 248 proximate second electrical contact 226.

There is a cavity 250 formed between the first male terminal member 204 and the second male terminal member 206 defined by the at least one flat surface 236 of the first male terminal member 204 and the at least one flat surface 246 of the second male terminal member 206. Cavity 250 has an opening 252 between the first electrical contact 216 and the second electrical contact 226. At opening 252, the recessed surface portion 238 of flat surface 236 and the flared surface portion 248 of flat surface 246, are present.

Referring again to FIGS. 9 and 10, metal contacts 260a-e are disposed on charger base 202. These metal contacts engage with corresponding magnets on electrical charging port 300, described below, and secure electrical charging assembly 200 and electrical charging port 300 in place while charging. Alternatively, the magnets could be disposed on the charger base 202 with the metal contacts on charging port 300.

If the robot is docking to a fixed electrical charging station, it may use camera 24a and 24b to maneuver it into position so that electrical charging port 300 can mate with electrical charging assembly 200. The cameras may use the fiducial markers associated with the charging station as a reference point for fine localization, which will be described in more detail below. As the robot maneuvers into place, achieving perfect alignment for mating of the electrical contacts 216 and 226 of the electrical assembly 200 with electrical contacts 304 and 306, respectively, of electrical charging port 300 can be difficult. Therefore, electrical charging assembly 200 and electrical charging port 300 have been specifically designed in order to ensure easier, more efficient, and less problematic mating to allow the robots to electrically re-charge more quickly.

Figure 11:
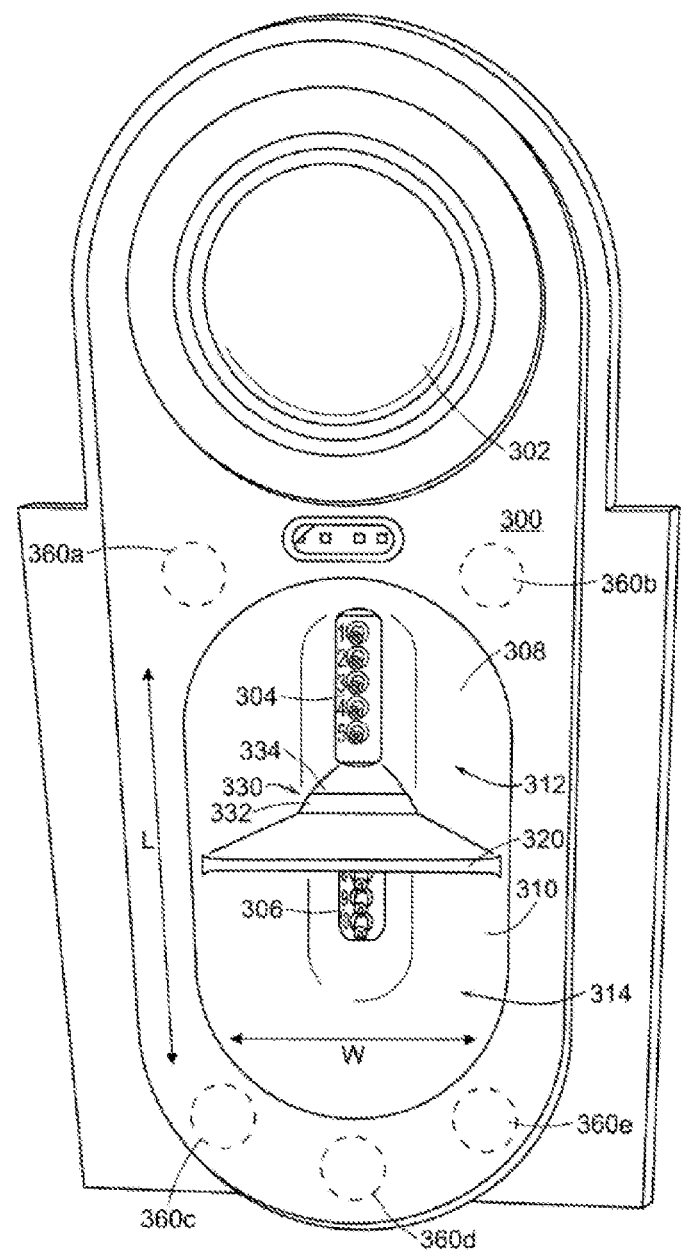
FIG. 11 is a perspective view of the electrical charging port of FIG. 10.
Figure 12:
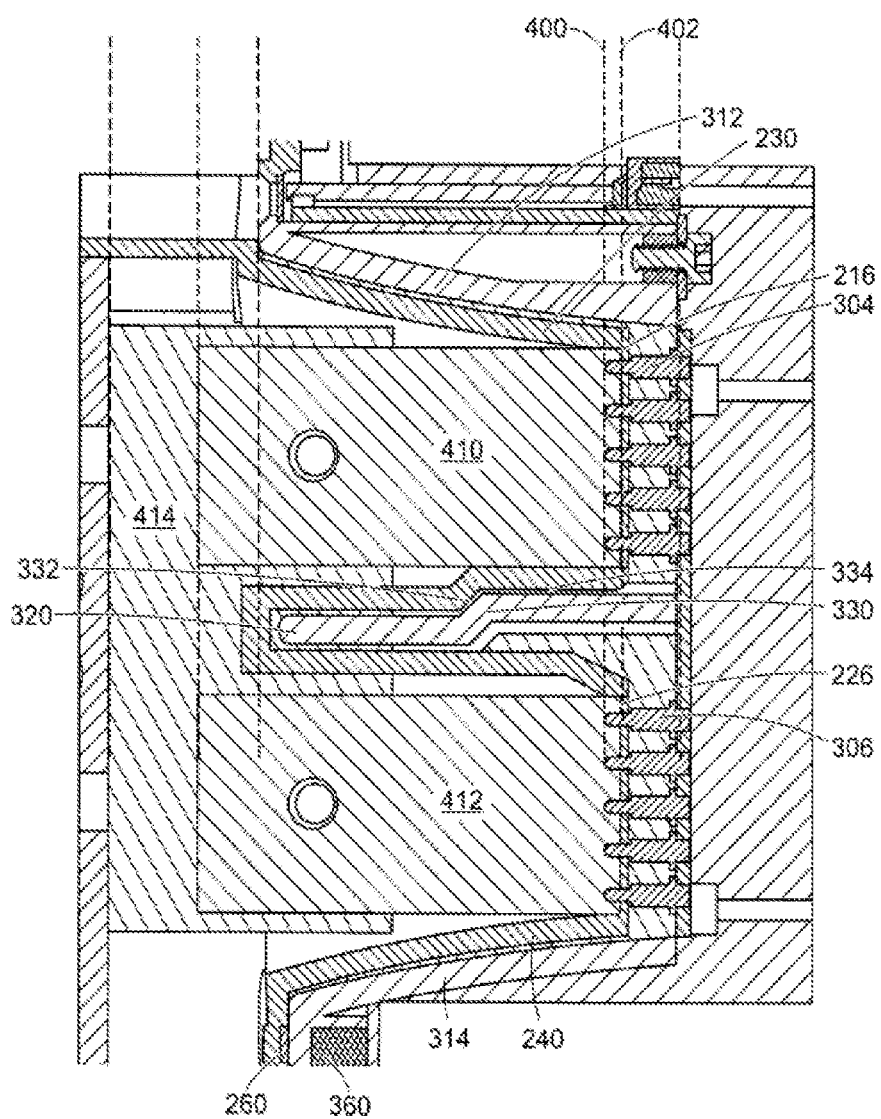
FIG. 12 is a cross-sectional view of the electrical charging assembly mated with the electrical charging port.

As can be seen in FIGS. 11 and 12, electrical charging port 300 includes a first cavity 308 and second cavity 310, which are configured to receive and engage with first male terminal member 204 second male terminal member 206, respectively, of electrical charging assembly 200, as robot base 20a is docking. Cavity 308 has concave, curved surfaces 312 which are complimentary to the curved surfaces 230, 232 and 234 of first male terminal member 204. In other words, the first cavity 308 may include curved surfaces 312 having radii of curvature substantially equal to the radii of curvature of the curved external surfaces (230, 232, and 234) of first male terminal member 204. Substantially equal in this case means just slightly larger to allow insertion and removal of first male terminal member 204 in cavity 308. Cavity 310 also has concave, curved surfaces 314 which are complimentary to the curved surfaces 240, 242 and 244 of second male terminal member 206. In other words, the second cavity 310 may include curved surfaces 314 having radii of curvature substantially equal to the radii of curvature of the curved external surfaces (240, 242, and 244) of second male terminal member 206. Substantially equal in this case means just slightly larger to allow insertion and removal of second male terminal member 206 in cavity 310.

The openings of cavities 308 and 310 are wider and longer than the width/length of the electrical contacts 216/226 of first male terminal member 204 second male terminal member 206. The extra width/length allows the first male terminal member 204 second male terminal member 206 to be more easily received within cavities 308 and 310 even if they are somewhat misaligned in the horizontal/vertical directions during the mating process. As the robot moves toward electrical charging assembly 200, the engagement of the complimentarily curved surfaces cause the first male terminal member 204 and the second male terminal member 206 to be guided into alignment so that engagement between electrical contacts 216/226 of electrical charging assembly and electrical contacts 304/306 of electrical charging port 300 will occur.

Thus, the radii of mating parts (male terminal members and cavities) are designed to provide coarse alignment when the male terminal members are first inserted into the cavities, and fine adjustment as full insertion is approached.

The electrical charging system provides an additional feature for easier vertical alignment. This is accomplished by the interaction of divider 320, which is between cavities 308 and 310, in combination with opening 352 of cavity 350 of electrical charging assembly 200. Flared surface portion 248 provides a wider opening so, if there is vertical misalignment, it causes the divider 320 to ride up vertically into place in cavity 350, as the docking process occurs.

When the first and second male terminals 204 and 206 are fully inserted into cavities 308 and 310, electrical charging assembly 200 is secured in place with electrical charging port 300 by means of magnets 360a-e, which engage with metal contacts 260a-e on electrical charging assembly 200. The magnets may be disposed beneath the external surface of electrical charging port 300 and, as such, they are shown in phantom.

There is an additional feature included in the electrical charging system, which is useful in the case of manual charging by an operator. If the electrical charging assembly 200 were inserted into the electrical charging port 300 improperly, i.e. upside down with electrical contact 216 of electrical charging assembly 200 connected to electrical contacts 306 of electrical charging port 300 and with electrical contact 226 of electrical charging assembly connected to electrical contacts 304 of electrical charging port 300, the polarities would be reversed and significant damage to robot base 20a would result.

To prevent this from happening, a stop 330 (see FIGS. 11 and 12) is included on the surface of divider 320 of electrical charging port 300. The stop 330 has an angled surface portion 332 and flat surface portion 334. As shown in FIG. 10, within cavity 250 of electrical charging assembly 200, there is a recessed surface portion 238, which allows for full insertion of electrical charging assembly 200 into electrical charging port 300. Recess 238 allows for clearance by first male terminal member 204 of stop 330 as the angled surface portion 332 and the flat surface portion 334 of stop 330 engage with the angled portion and flat portion of recessed surface portion 238 like a puzzle piece. If the electrical charging assembly 200 were upside down, when inserted into electrical charging port 300 surface 246 of second male terminal member 206 would contact stop 330 and be prevented from full insertion and contact with electrical contacts 304.

As shown in FIG. 12, when electrical contacts 216 and 226 of male terminal members 204 and 206, respectively, engage with electrical contacts 304 and 306, the electrical contacts 304 and 306 are compressed, as these contacts may be in the form of spring loaded pins. Electrical contacts 304 and 306 may be compressed from their fully extended position at line 400 to their compressed position (not shown) at line 402. Each of electrical contacts 304 and 306 are shown to include five spring loaded pins. The number of pins used is dependent upon the expected electrical current to be carried during the charging process and the capacity of the individual pins. The use of multiple spring loaded pins for the electrical contacts is beneficial to ensure proper contact with the electrical contacts 216 and 226 of male terminal members 204 and 206 even in the case of manufacturing variations and wear on components.

When electrical contacts 304 and 306 are in the compressed position, magnets 360a-e of electrical charging port 300 are in close proximity with metal contacts 260a-e of electrical charging assembly 200 and they magnetically engage to secure in place electrical charging assembly 200 and electrical charging port 300. In this position, it can be seen that upper and lower curved surfaces 230 and 240 of male terminal members 204 and 206, respectively, are complimentarily engaged with surfaces 312 and 314 of cavities 308 and 310, respectively.

Also depicted in FIG. 12 are bus bar 410 of first male terminal member 204 and bus bar 412 of second male terminal member 206. The bus bars are connected to mount 414 to affix them within electrical charging assembly 200 at the end opposite electrical contacts 216 and 226.

Figure 13A:
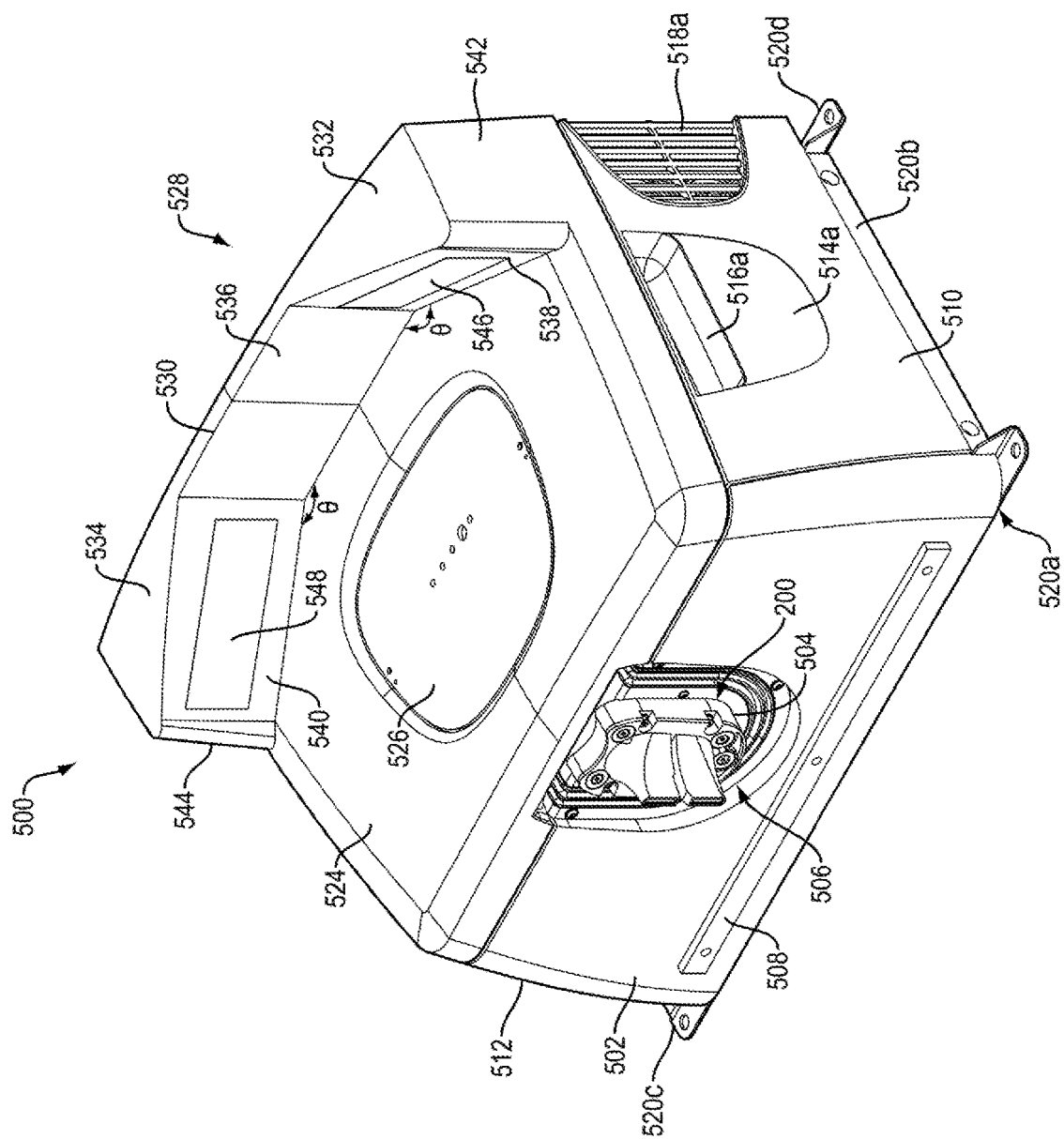
FIG. 13A is a perspective view of the charger docking station according to this invention.
Figure 13B:
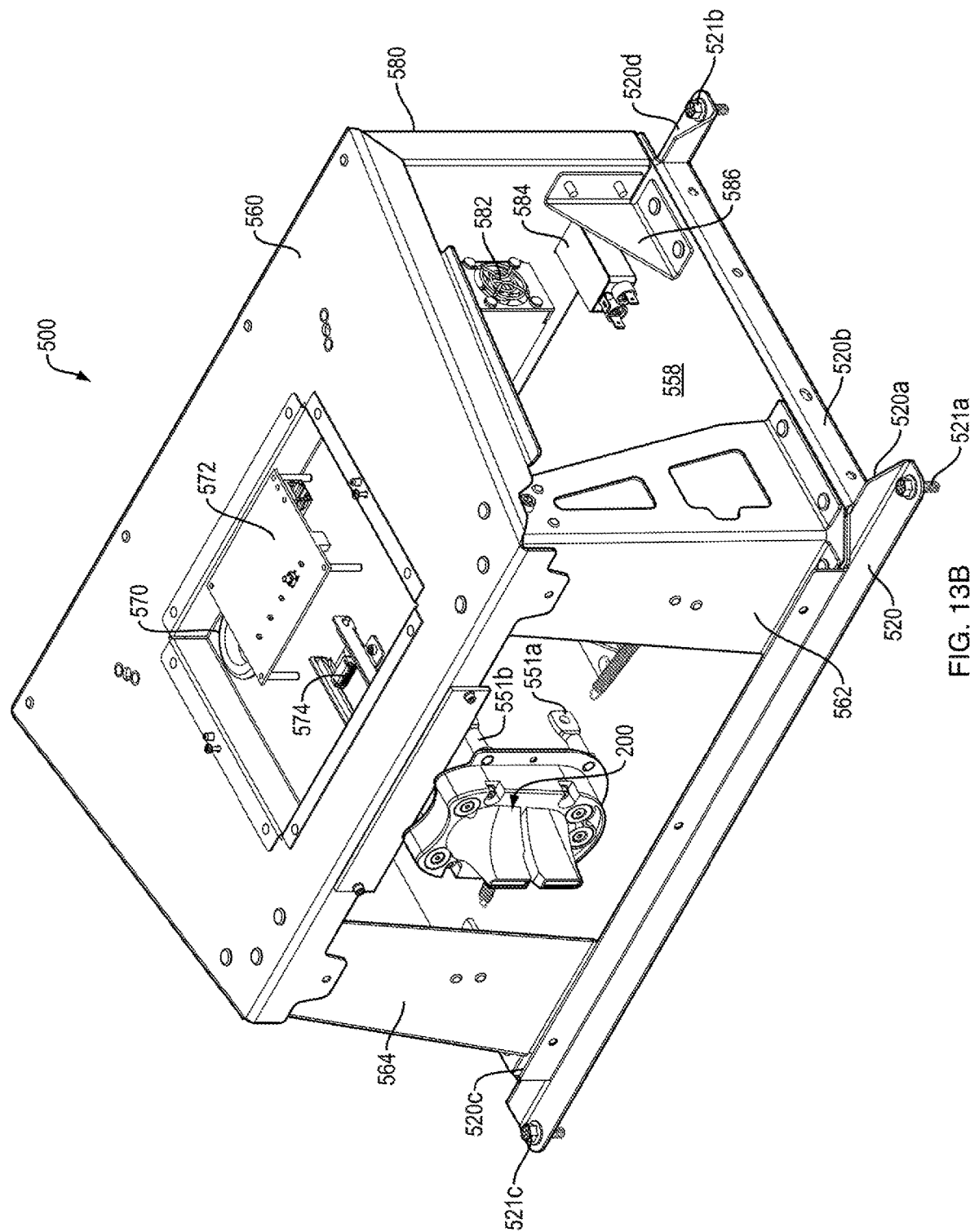
FIG. 13B is a perspective view of the charger docking station of FIG. 14A with the exterior cover removed depicting the interior of the charger docking station.
Figure 14A:
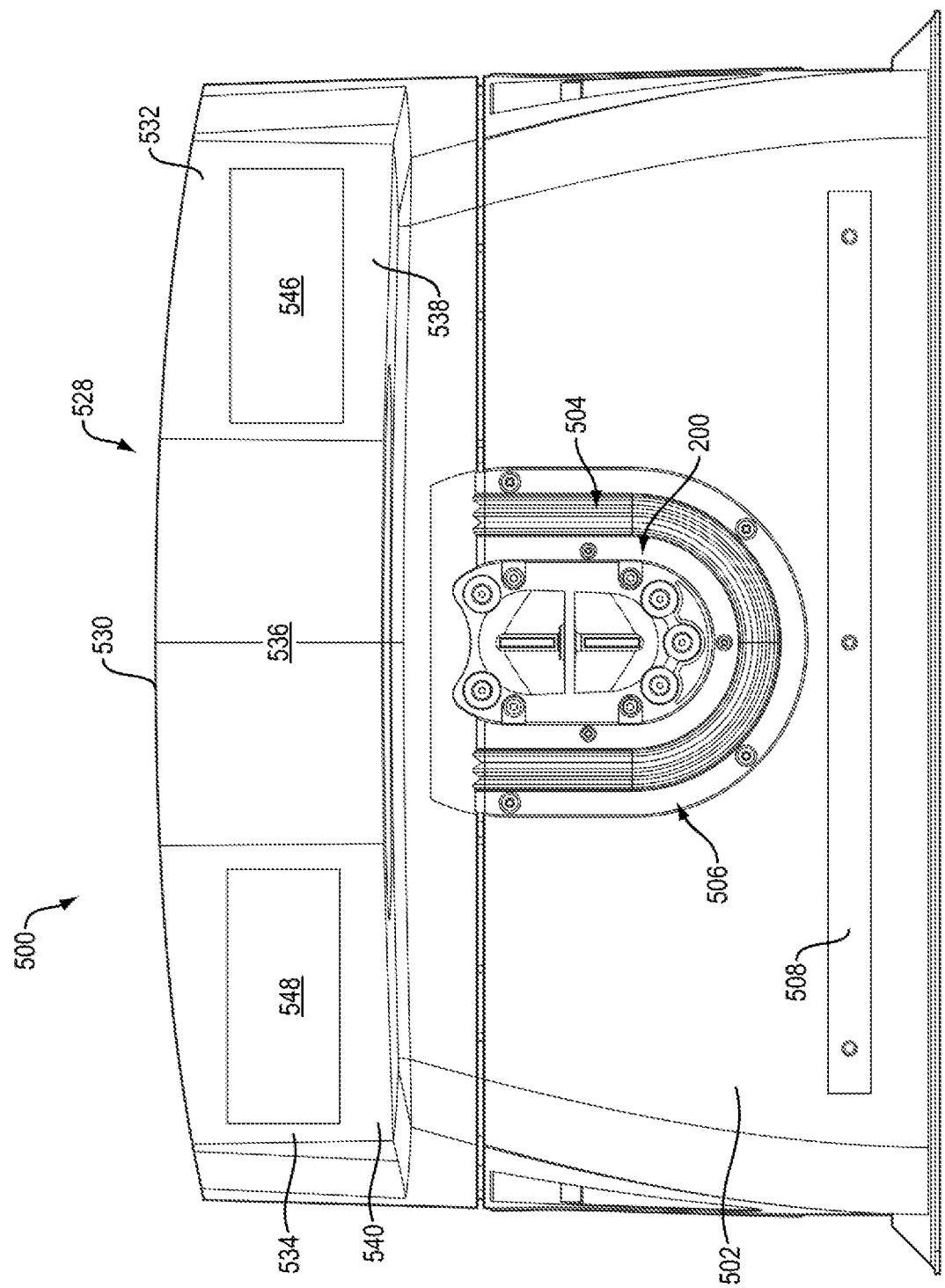
FIG. 14A is a front view of the charger docking station of FIG. 13A.

A charger docking station 500 according to an aspect of this invention is depicted in FIGS. 13-16 and 17. Referring particularly to FIGS. 13 and 14, charger docking station 500 includes electrical charging assembly 200, as described above, which projects from front cover 502 of charger docking station 500. Electrical charging assembly 200 is mounted to charger docking station 500 on U-shaped rubber bellows mount 504 in order to seal opening 506 in front cover 502 while also allowing electrical charging assembly 200 to move in six degrees of freedom (as will be described below) to facilitate a smooth docking process of a robot when recharging is needed.

Figure 15A:
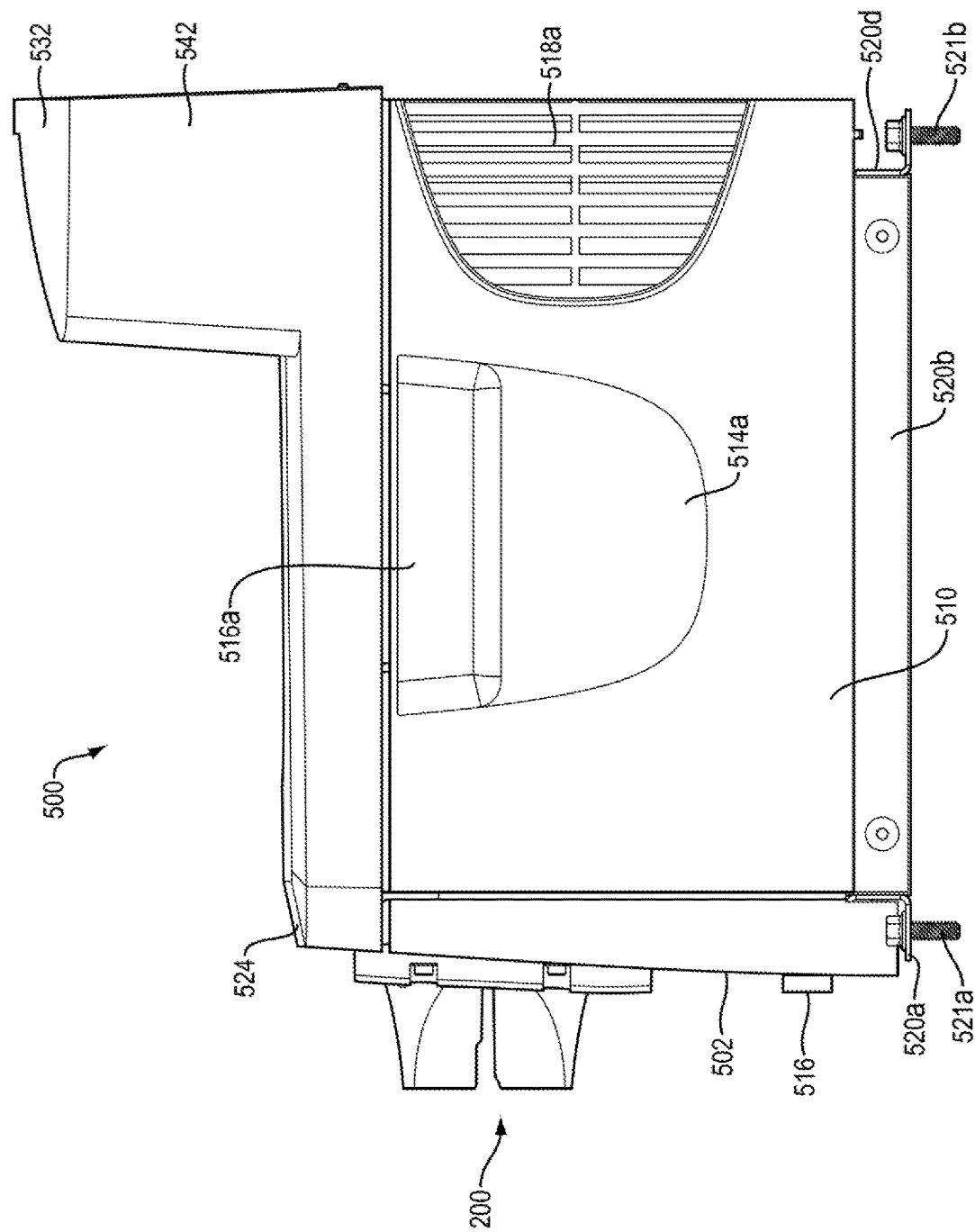
FIG. 15A is a left side view of the charger docking station of FIG. 13A.
Figure 16A:
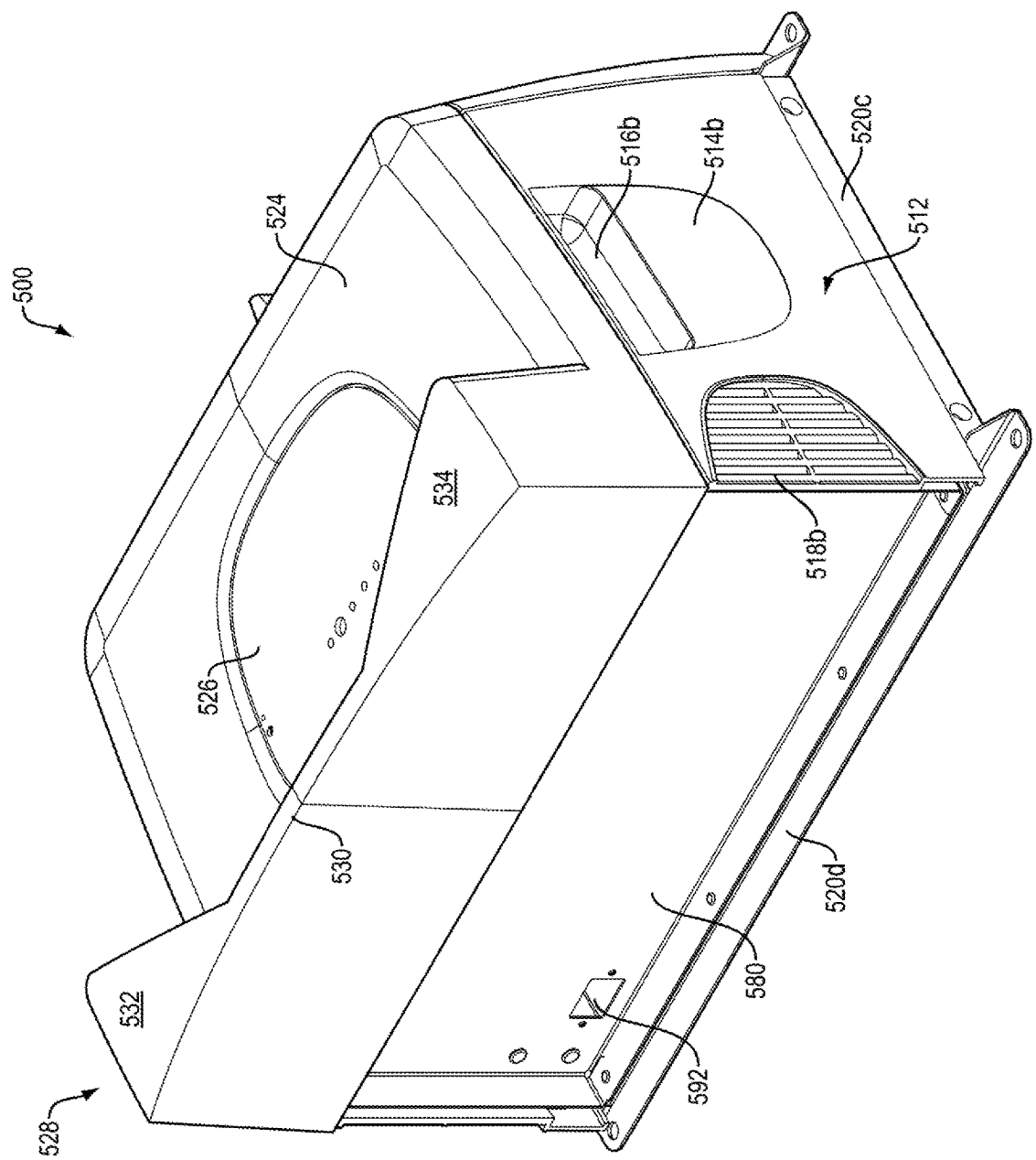
FIG. 16A is a rear perspective view of the charger docking station of FIG. 13A.

Also shown is protective bumper 508, which may be made of metal, mounted horizontally across the bottom portion of front cover 502 to protect the charger docking station 500 from damage in the event that a robot does not smoothly dock. Charger docking station 500 further includes right side cover 510 and left side cover 512 (not visible in FIG. 13A). In right side cover opening 514a is located grip area 516a which allows a hand to be inserted for more easily lifting the charger docking station 500, as shown in FIG. 15A. Although not visible in this view, a similar opening and grip area is included in left side cover 512, which are depicted in FIG. 16A as opening 514b and grip area 516b. Also shown in an opening at the back of right side cover 510 are vents 518a to provide cooling for the electrical components within charger docking station 500. A similar vent 518b is included in the left side cover 512 visible in FIG. 16A.

A metal frame comprising front frame member 520a, right side frame member 520b, left side frame member 520c, and back side frame member 520d are interconnected to form the base structure for charger docking station 500. Referring to FIG. 13B, each of the frame members is secured to a floor in the warehouse by means of bolts 521a-d and protective bumper 508 is secured to metal frame 520 via front frame member 520a. Since protective bumper 508 is external to and protrudes out from front cover 502, it is the first point of impact with a robot as it docks with charger docking station 500. In the event of an inadvertent high force impact by a robot, such high forces will be imparted on the protective bumper rather than the front cover 502. Front cover 502 as well as right side cover 510 and left side cover 512 are typically made a hard plastic material and are susceptible to cracking/breaking if impacted by a robot. The forces imparted on the protective bumper 508 are further diverted to metal frame 520 through front frame member 520a. Front frame member 520a comprises a C-shaped member that extends across the width of charging station 500 and a flange integral with and extending from a top surface of the C-shaped member. Protective bumper 508 interconnects to the flange via a plurality of apertures in front cover 502. The forces from bumper 508 are transmitted to the front frame member through the flange and c-shaped member and further transmitted to the right, left and back side frame members 520b-d. Ultimately the forces are transmitted through bolts 521a-d to the warehouse floor. Thus, this protective bumper system absorbs and diverts forces imparted by a robot away from the hard plastic front cover 502, protecting it from damage.

Top cover 524, which is also made of a hard plastic material, includes a user interface panel 526 disposed in a cavity in the surface of top cover 524 which may include certain indicators and controls for a user to operate the charger docking station. For example, lighting signals to indicate various states such as "Ready", "Charging", "Power On", "Recovery Mode", and "Fault" or "E-Stop" may be included. Buttons such as "Power on/off", "Start manual charge", "Undock", "Reset", and "E-Stop" may be included.

Along the back edge of top cover 524 is a back panel 528, which comprises a center panel section 530 and side panel sections 532 and 534 on the right and left sides, respectively, of center panel 530. Center panel 530 has a rectangular front surface 536 which is substantially parallel to front cover 502. Right side panel 532 has a rectangular front surface 538 and left side panel 534 has a rectangular front surface 540.

Right and left side panels 532 and 534 have wide sidewalls 542 and 544, respectively, on one side and converge to narrower widths on the other sides which interconnect with center panel section 530. Thus, right and left side panels 532 and 534 and wedge-shaped. As a result, their front surfaces 538 and 540 are not parallel with front surface 536 of center panel 530 or front cover 502. They are each disposed at an angle, $\Theta$, with respect to surface 536. Fiducial markers 546 and 548 (e.g. a two-dimensional bar code) disposed on front surfaces 538 and 540, respectively, are also disposed at the angle, $\Theta$, relative to front surface 536 and the front cover 502.

As will be described in detail below, the robots use the angled fiducial markers for precision navigation during the process of docking with the charger docking station by viewing them with their onboard cameras. To generally navigate to the charger docking station when recharging is needed, the robots navigate in the same manner as they do when navigating to product bins as described above. Charging station 500 may be associated with a pose located in close proximity to the front cover 502 and generally aligned (rotationally) such that the robots' onboard cameras are facing toward back panel 528.

Figure 14B:
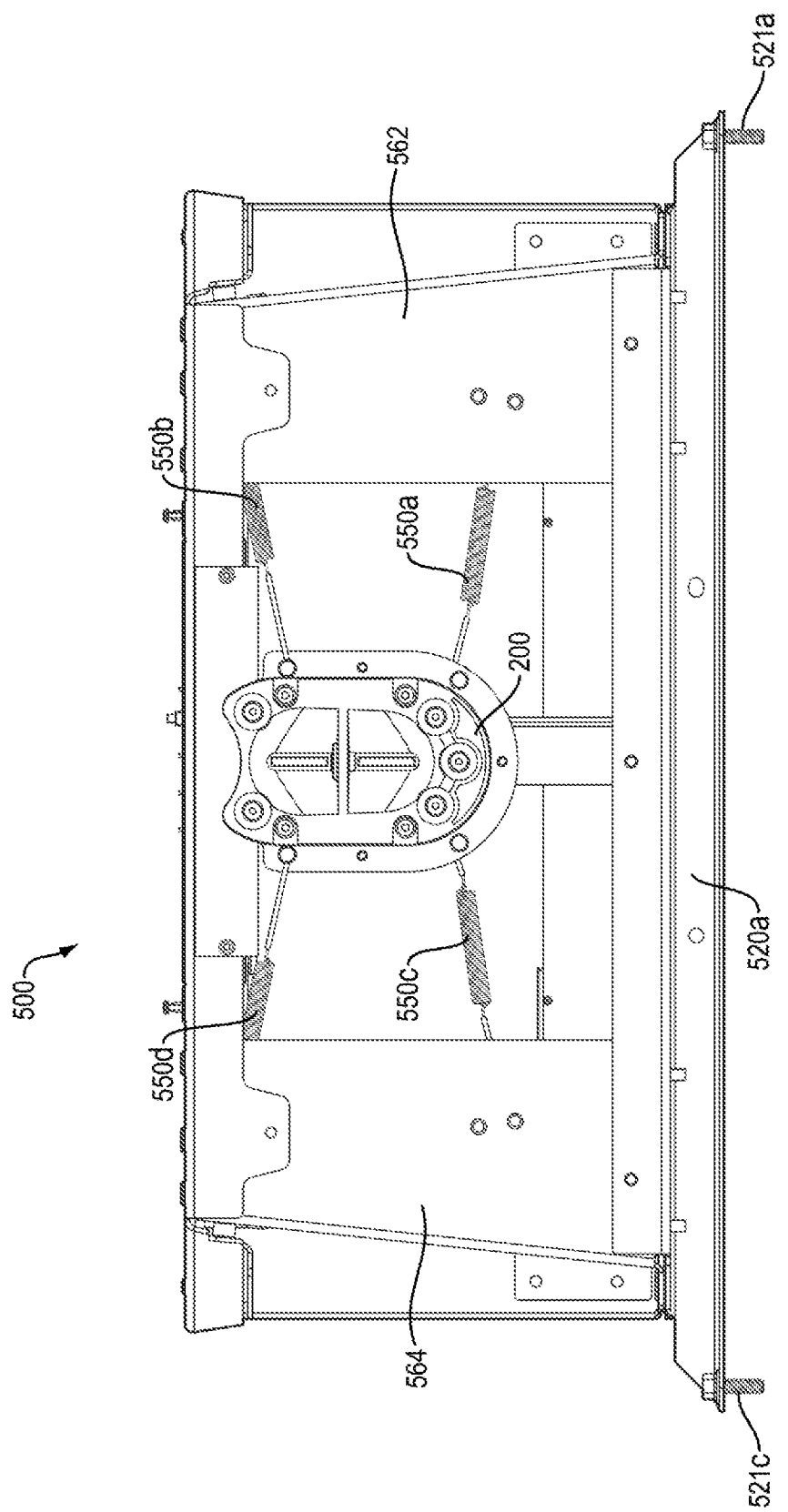
FIG. 14B is the front view of the charger docking station of FIG. 14A with the exterior cover removed depicting the interior of the charger docking station.

Referring to FIGS. 13B and 14B, compliant members 550a-d, which may include springs, are connected to legs 551a-d (legs 551c and 551d are not visible), respectively, on electrical charging assembly 200 to allow a certain amount of movement in all six degrees of freedom to account for small errors in navigating the robot to the charger docking station while still enabling proper mechanical and electrical connection between the electrical charging assembly 200 and electrical charging port 300, as shown in FIG. 12, for example.

Figure 15B:
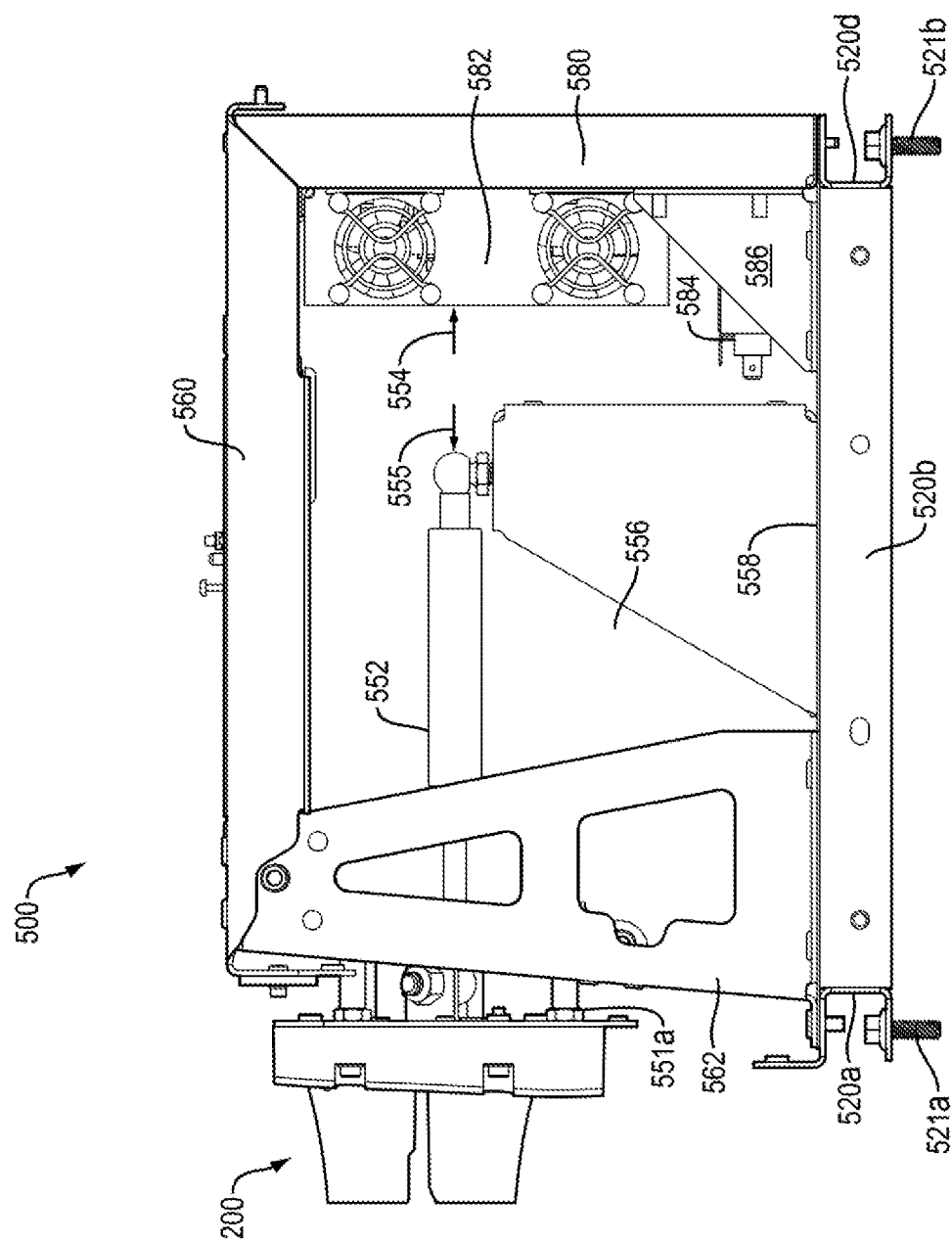
FIG. 15B is the left side view of the charger docking station of FIG. 15A with the exterior cover removed depicting the interior of the charger docking station.

In addition, as can be seen in FIG. 15B, gas spring 552 is connected to electrical charging assembly 200 to stabilize it as it moves along the axis of gas spring 552 as indicated by arrows 554 and 555. Gas spring 552 is mounted on frame 556 which is affixed to floor panel 558 of the charger docking station 500. As the robot moves toward charger docking station 500 during the mating process, electrical charging port 300 (described above) contacts electrical charging assembly 200 and applies a force in the direction of arrow 554. Gas spring 552 provides resistance in the direction of arrow 555 sufficient to allow some amount of movement during mating of electrical charging port 300 with electrical charging assembly 200 but prevent excessive movement in the direction of arrow 554 to act as a stop and ensure proper mating.

In addition, as the electrical charging port 300 is being retracted from the electrical charging assembly 200 during the un-mating process, due to the magnetic connection between the electrical charging assembly 200 and the electrical charging port 300 (described above), electrical charging assembly 200 will be pulled in the direction of arrow 555 until the magnetic force is overcome. Gas spring 552 also ensures that the movement is limited, by providing a force in the direction of arrow 554.

While the electrical charging port 300 (which is the female portion of the connector) is described herein to be mounted on the robot and the electrical charging assembly 200 (which is the male portion of the connector) is described herein as being mounted on the charging station, of course, these components could be reversed. In which case the electrical charging port 300 would be mounted on the charging station and the electrical charging assembly 200 would be mounted on the robot. Moreover, as will be apparent to those skilled in the art, other charger ports and designs may be used in connection with the embodiments described herein.

Referring again to FIG. 13B, top panel 560, which is supported in part by frame legs 562 and 564 mounted on floor panel 558, includes a cavity in which are housed controller board 572 and an infrared (IR) transceiver board 574. Controller board 572 provides overall control of charger docking station 500, including activating the charging protocols, selecting charging parameters and profiles, monitoring charging conditions and status (e.g. charging state and battery temperature) and communications with the robot, all of which are described in more detail below. The IR transceiver board 574 is used for communication with the robot during the docking and charging processes and may utilize an IrDA (Infrared Data Association) communications protocol.

Figure 16B:
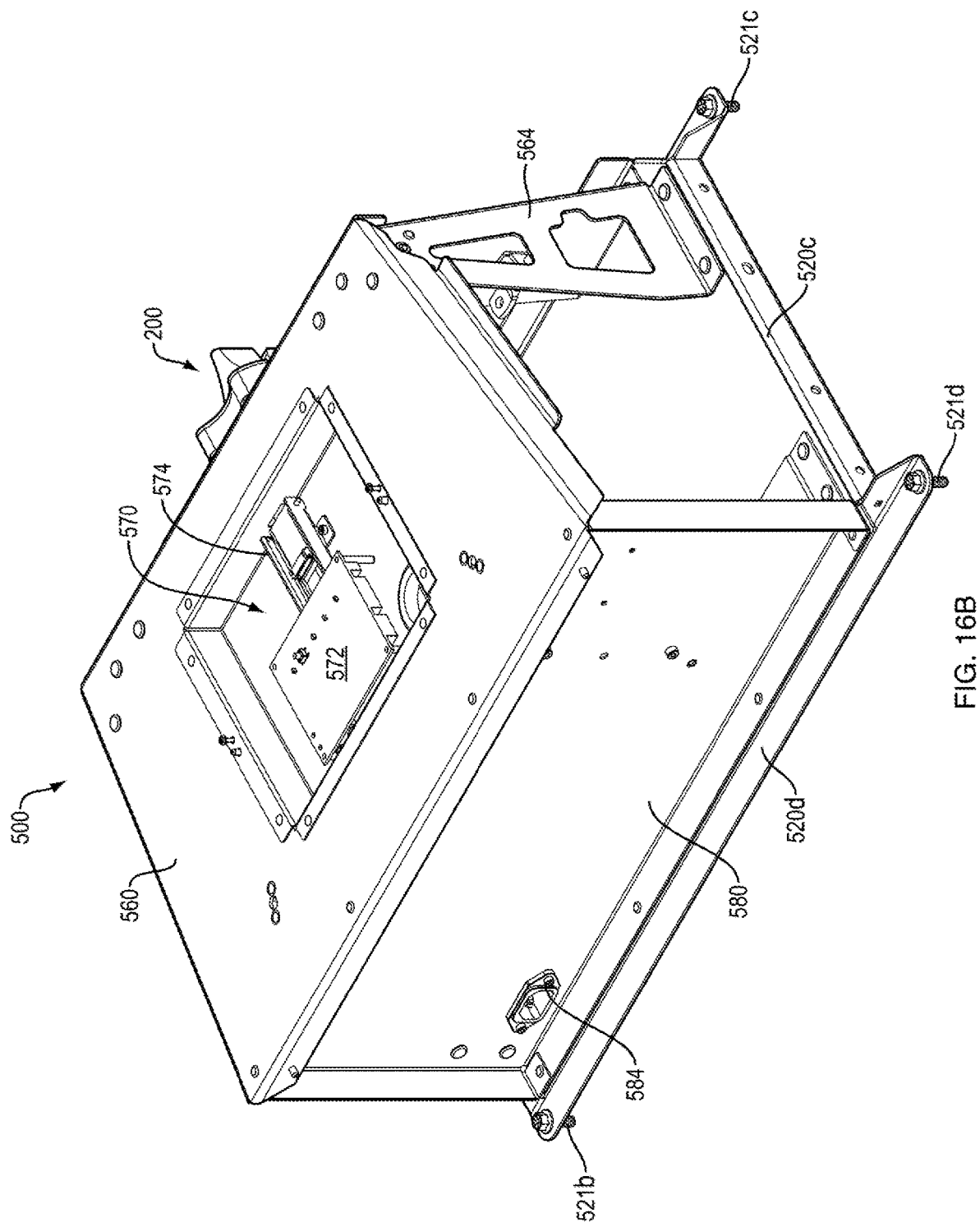
FIG. 16B is the rear perspective view of the charger docking station of FIG. 16A with the exterior cover removed depicting the interior of the charger docking station.

Continuing to refer to FIG. 13B as well as FIG. 15B, back wall panel 580 is shown to support power supply 582 which is powered by the warehouse power. Back wall panel 580 may also function as a heat sink for power supply 582 and may be made of a different metal than the other panels to better conduct heat. Back panel 580 further supports top panel 560 along with frame legs 562 and 564. The warehouse power is fed to charger docking station 500 through connector 584, which may be an IEC connector, for example. Wall 586 connected to floor panel 558 and positioned adjacent to connector 584 may be used to provide additional protection for the power supply to the charger docking station FIGS. 16A and 16B provide a perspective view from the rear of charger docking station 500 with the cover on and off, respectively. These views also allow for the right side of charger docking station to be seen. In FIG. 16A back wall 580 is shown to include a port 592 through which the power supply from the house is fed to connect to electrical connector 584. The back of electrical connector 584, can be seen protruding through a hole in back wall 580, FIG. 16B.

Robot Docking

Figure 17:
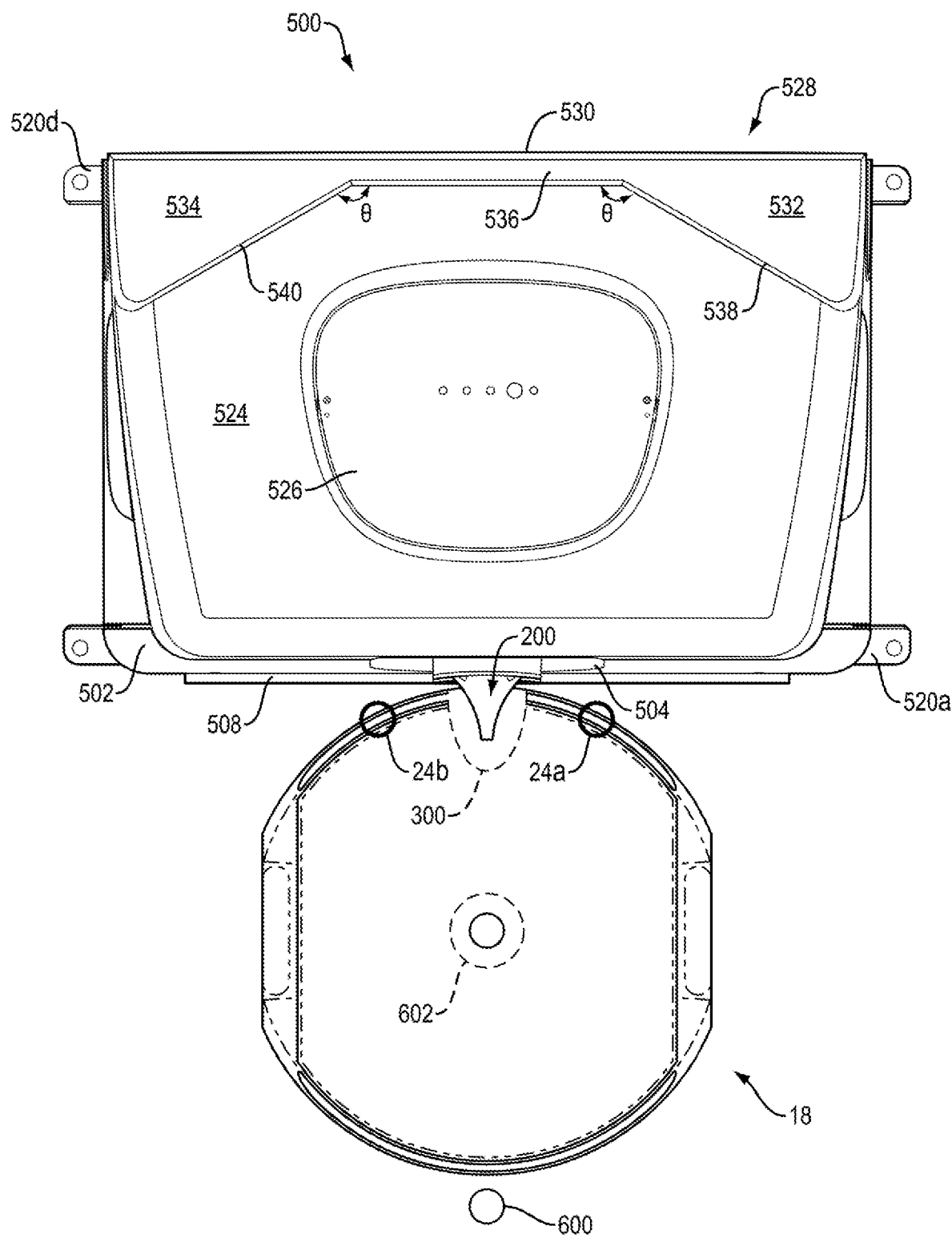
FIG. 17 is a top view of the charger docking station of FIG. 13A shown with a docked robot.
Figure 18:
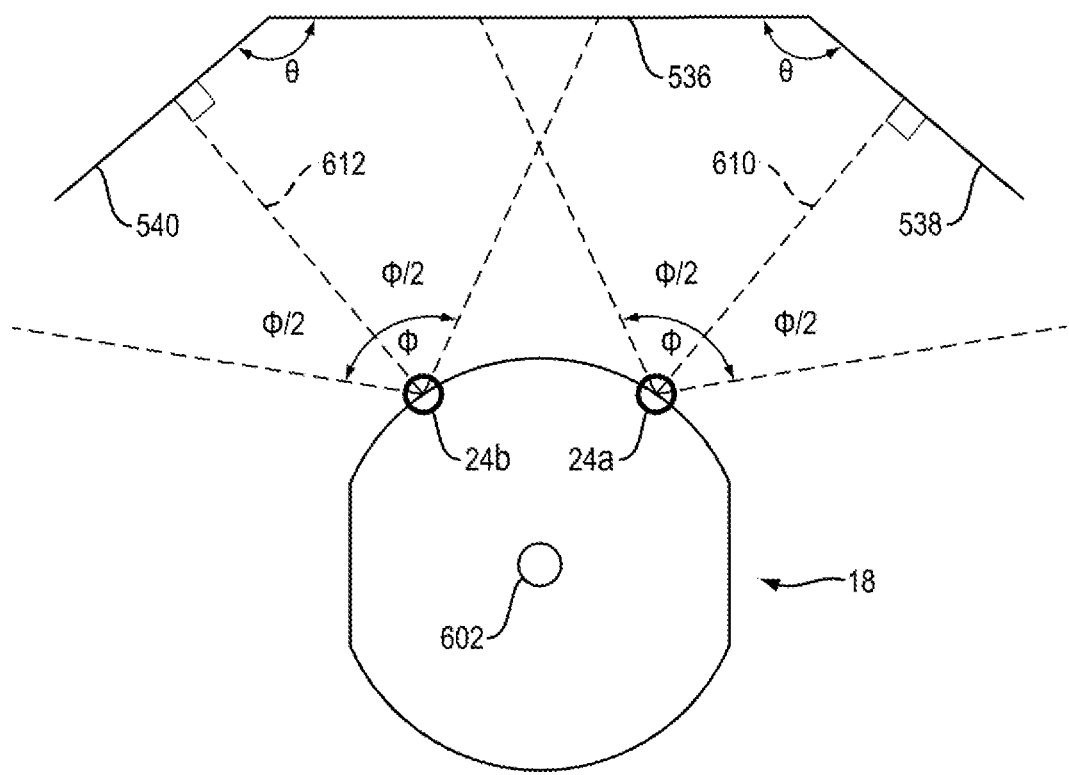
FIG. 18 is a schematic view of a robot docking with the charging station according to an aspect of this invention.

The docking of a robot to the electrical charging station 500 for recharging is described with regard to FIGS. 17 and 18. In FIG. 17, robot 18 having electrical charging port 300 is shown mated to electrical charging assembly 200 of charging station 500. Robot 18 may, for example, navigate to location 600, which is defined by a pose stored for the charging station. Navigation to pose 600 is undertaken in the manner described above for navigating robots throughout the warehouse to various bin locations. Once at pose 600, a precision navigation process is undertaken to position the robot 18 at location 602, in which location the electrical charging port 300 is mated with electrical charging assembly 200 and robot 18 is docked at charging station 500 for recharging.

The orientation of surfaces 538 and 540 (and fiducials 546 and 548, respectively) relative to cameras 24a and 24 is described with regard to FIG. 18. As shown in FIG. 18, robot 18 is located at position 602, thus it is docked at charging station 500. In this position, the field of view Φ (approximately 79.4 degrees) of camera 24a is shown to span across surfaces 536 and 538. The optical axis 610 (i.e. the centerline of the field of view or Φ/2) of camera 24a intersects surface 38 and fiducial 46 at a substantially perpendicular angle. In addition, in this position, the field of view Φ (approximately 79.4 degrees) of camera 24b is shown to span across surfaces 536 and 540, slightly overlapping the field of view of camera 24a. The combined field of views of the cameras provides the robot 18 with an effective field of view of approximately 120 degrees. The combined field of few is less than the sum of the fields of view of the cameras, due to the overlapping sections creating a blind spot for the robot.

The optical axis 612 (i.e. the centerline of the field of view or Φ/2) of camera 24b intersects surface 40 and fiducial 48 at a perpendicular angle. In order to ensure that when docked the optical axes of the cameras will be aligned perpendicular to surfaces, 538 and 540, the angle Θ which is the orientation of surfaces 538 and 540 relative to surface 536 must be properly set. In this example, the angle Θ is approximately 150 degrees. By positioning the fiducials in this manner, the visibility of the fiducials by the cameras 24a and 24b is increased.

As described above, since the cameras are offset from the center of the robot they combine to provide a wide field of view. However, the orientation of the cameras make viewing the fiducials on the charging station challenging. To address this issue, the fiducials may be oriented at an angle to better align with the cameras, which makes the fiducials easier to more accurately read. This may be accomplished by orienting the optical axis of the camera to be at a substantially perpendicular angle to and centered on the fiducial when the robot is in the docked position, as is shown in FIG. 18.

Controlling robot 18 so that it mates with the charging station 500, may requires a more precise navigation approach than that used to navigate the robot to pose 600. Once at pose 600, the robot may make use of the perceived positions and orientations of the fiducials 546 and 548 on surfaces 538 and 540, respectively, in its camera frames. At pose 600, robot 18 is close enough to perceive fiducials 546 and 548 and is approximately centered on charging station 500. A docking control algorithm may be used which permits for errors in the robot navigating to this initial pose location. In other words, the navigation approach used to arrive at pose 600, which may use 5 cm-resolution maps, may not be precisely position at the pose location. While positioned nominally at pose 600, robot 18 obtains information about the position and orientation of fiducials 546 and 548 using its cameras 24a and 24b. As it moves toward charging station 500, it attempts to minimize two error quantities as follows:

(1) Each camera will detect one fiducial: the left and right cameras will detect the left and right fiducials, respectively. The fiducials, once detected, can be transformed internally so that to the robot, they appear to be perfectly perpendicular to the path of the robot (i.e., "flat", as perceived from the camera, rather than appearing skewed). We can then detect the relative sizes of each fiducial marker, and use that to determine if the robot is closer to one fiducial than the other. This indicates that the robot is not perfectly centered in its approach, and needs to move towards the center line. If we refer to the pixel area of the corrected left fiducial as $S_L$ and the pixel area of the corrected right fiducial as $S_R$, then the robot needs to minimize $|S_R - S_L|$.

(2) Within the left camera image, the left dock fiducial will be some number of pixels from the right side of the image. We will call this number $D_L$. Likewise, the for the right camera image, the right dock fiducial will be some number of pixels $D_R$ from the left side of the image. The robot therefore needs to minimize $|D_R - D_L|$.

As the robot needs to correct for the error in (1) first, we issue a constant linear velocity to the robot, and issue a rotational velocity of $k_S (S_R - S_L)$ to the robot until this value gets below some threshold $T_S$. The term $k_S$ is a proportional control constant whose value is in the range (0, 1]. When the threshold $T_S$ is satisfied, the robot attempts to minimize the error in (2) by issuing a rotational velocity to the robot of $k_D (D_R - D_L)$, where $k_D$ is also a proportional control constant in the range of (0, 1]. We continue doing this until either (a) the robot reaches the dock, or (b) the error $|S_L - S_R|$ grows outside the threshold $T_S$, at which point we switch back to minimizing the error in (1).

The above described precision navigation approach is one example of various approaches that could be used to dock robot 18 with charging station 500.

Robot Charging Hardware

The robots described in the preferred embodiment are configured to automatically mate with a charging station during normal "live" operation, i.e. the robots remain under power during charging and they may exchange information with the charging station while mated via optical communications or otherwise. For example, the charging station obtains the temperature of the robot's batteries during charging, while the robot obtains the amount of charge transferred to the batteries from the charging station.

Figure 19:
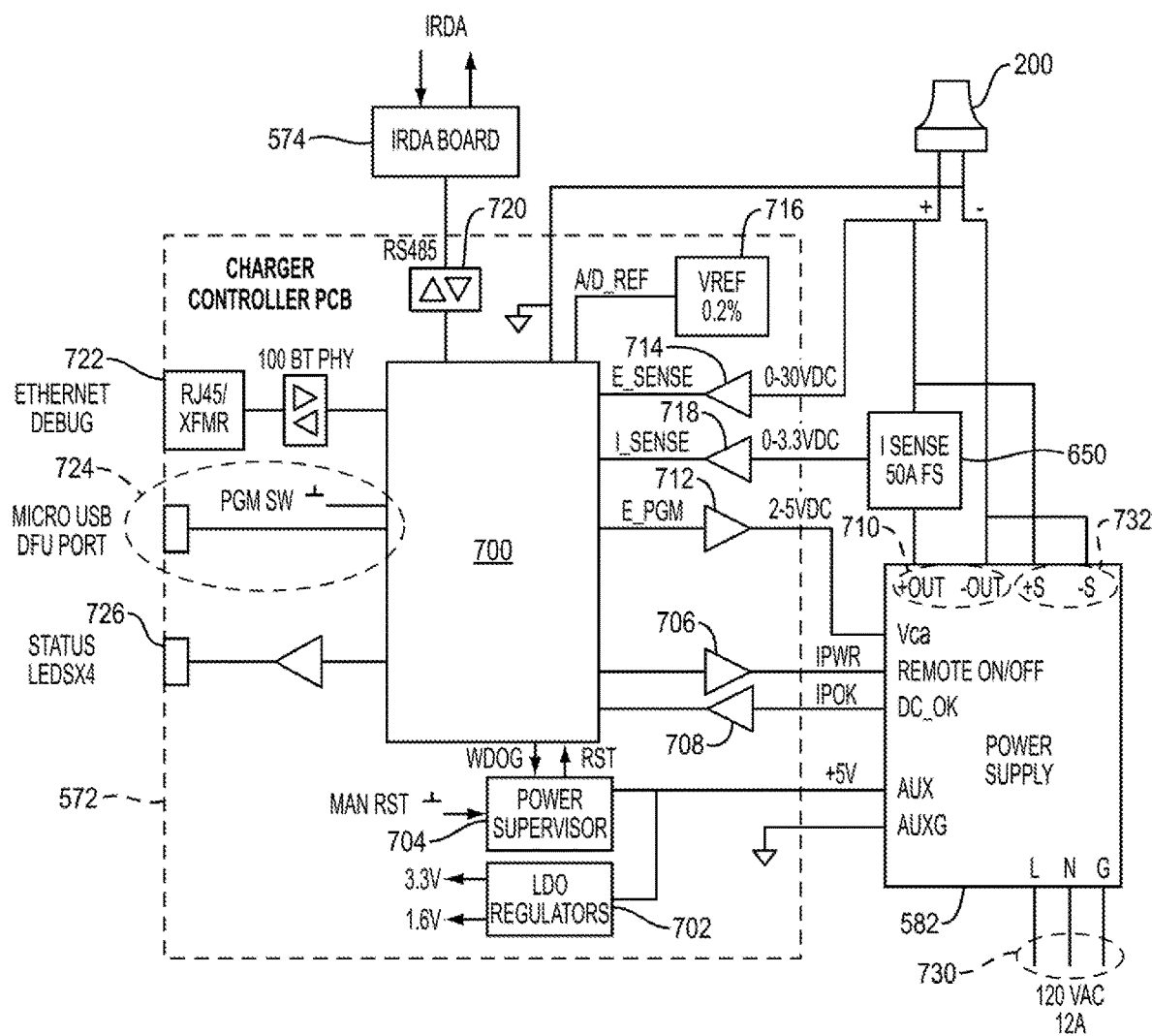
FIG. 19 is a schematic diagram of the electrical components of the charging station.

Referring to FIG. 19, controller board 572 provides overall control of charging station 500, including activating the charging protocols, selecting charging parameters and profiles (based on battery/robot type), monitoring charging conditions and status (e.g. charging state and battery temperature) and communications with the robot. The IR transceiver board 574 may be used for communication with the robot during the docking and charging processes and may utilize an IrDA (Infrared Data Association) communications protocol. Communications between robot and the charging station may be implemented in various known ways, including via wired connection. The charging station also includes male electrical charging assembly 200 which, when the robot is docked, mates with the female electrical charging port 300 of the robot. It will be understood by those skilled in the art that other forms of electrical connectors may be used, including gender-less flat plates disposed on insulating surfaces.

There is a power supply 582, which may be a voltage programmable power supply, and a current sensor board 650 for sensing the amount of charge output from power supply 582 to the robot via male electrical charging assembly 200 when mated with female electrical charging port 300 on the robot. The IR transceiver board 574, power supply 582, and current sensor board 650 are each interconnected to microprocessor 700 on controller board 572. Microprocessor 700 may be an ST Microsystems Cortex M4 derivative or other Cortex or comparable type of processor.

In one embodiment, the charging station 500, may be capable of accommodating the charging requirements of LiFePO4 (Lithium Iron Phosphate) batteries using a three-phase charging profile, which may be a typical battery used in the robots of the type described herein. For this battery type, a 1 kW power supply providing a 1.5 C charge rate would meet these constraints. However, it will be understood that the charging station 500 may be capable of charging various battery types with different charging requirements.

Continuing to refer to FIG. 19, controller board 572 may include low drop-out (LDO) regulators 702 to provide well-regulated +3.3V and 1.8V (or as-needed) internal supply voltages which are powered by the auxiliary 5V output of power supply 582. The controller board may also include a power supervisory circuit 704 capable of resetting the microprocessor 700 on power-on, power interruption, watchdog timeout, or manual button press cases. With respect to microprocessor 700 I/O functions, there is an output 706 from microprocessor 700 to turn on main output of power supply 582 to enable charging and an input 708 from power supply 582 to sense that main output 710 power supply 582 is functioning.

Microprocessor 700 controls the output of power supply 582 via voltage input provided by buffered analog output 712. A scaled and buffered analog voltage input 714 taken from the output 710 of the power supply 582 along with precision reference voltage from voltage reference circuit 716 are input to microprocessor 700 to monitor charging voltage being provided to the robot during charging. In addition, buffered analog current input 718 taken from current sensor board 650 is used by microprocessor 700 to monitor charging current being output to the robot.

Controller board 572 has several ports and inputs/outputs, including communications interface 720 which allows for RS485 serial communications between microprocessor 700 and IrDA board 574. This, in turn, allows for infrared communications between charging station 500 and the robot. There is an Ethernet port 722 to permit debug/diagnostics via a terminal shell and a micro USB connector and pushbutton 724 to provide access to device firmware update (DFU) bootloader. Also, there are outputs 726 to drive four high-brightness LEDs for ready/charging/fault indication on a display on user interface panel 526.

In one embodiment, power supply 582 may be a Meanwell RSP-1000-27 power supply, which is capable of providing a 37 A output current. Input power 730 to power supply 582 may be 120VAC from the internal power from the warehouse. The main power supply output voltage/current 710 may be controlled by the microprocessor 700 by actively driving an input pin by buffered analog output 712 using a voltage ranging from 2.5V to 4.5 volts to control charging supply current (constant current phase) or voltage (constant voltage phase). The supply output voltage/current 710 may be adjusted, for example, to output 30V open circuit with a 4.5V input delivered by buffered analog output 712. The S− and S+ sense pins 732 may sense the current/voltage output 710 and be used as feedback for power supply 582.

As the current is being provided to the robot from the charging station 500 via charging assembly 200, the charging current may be measured using a hall sensor on current sensor board 650 connected to the positive output of the power supply 582. The measurement range of sensor board 650 may be positive-only over a range of 0-50 A and a buffered analog current input 718 taken from current sensor board 650 may be used by microprocessor 700 to monitor charging current (and total charge) being output to the robot. And, as the current is being provided to the robot, the voltage present at the charging assembly 200 may be sensed by providing a voltage signal from the positive side output of power supply 582 which may be scaled, buffered and fed by 714 to microprocessor 700. Nominal voltage range may typically be up to 32V full scale. The negative side of the charging assembly 200 may be connected to the ground plane of the controller 700.

Figure 20:
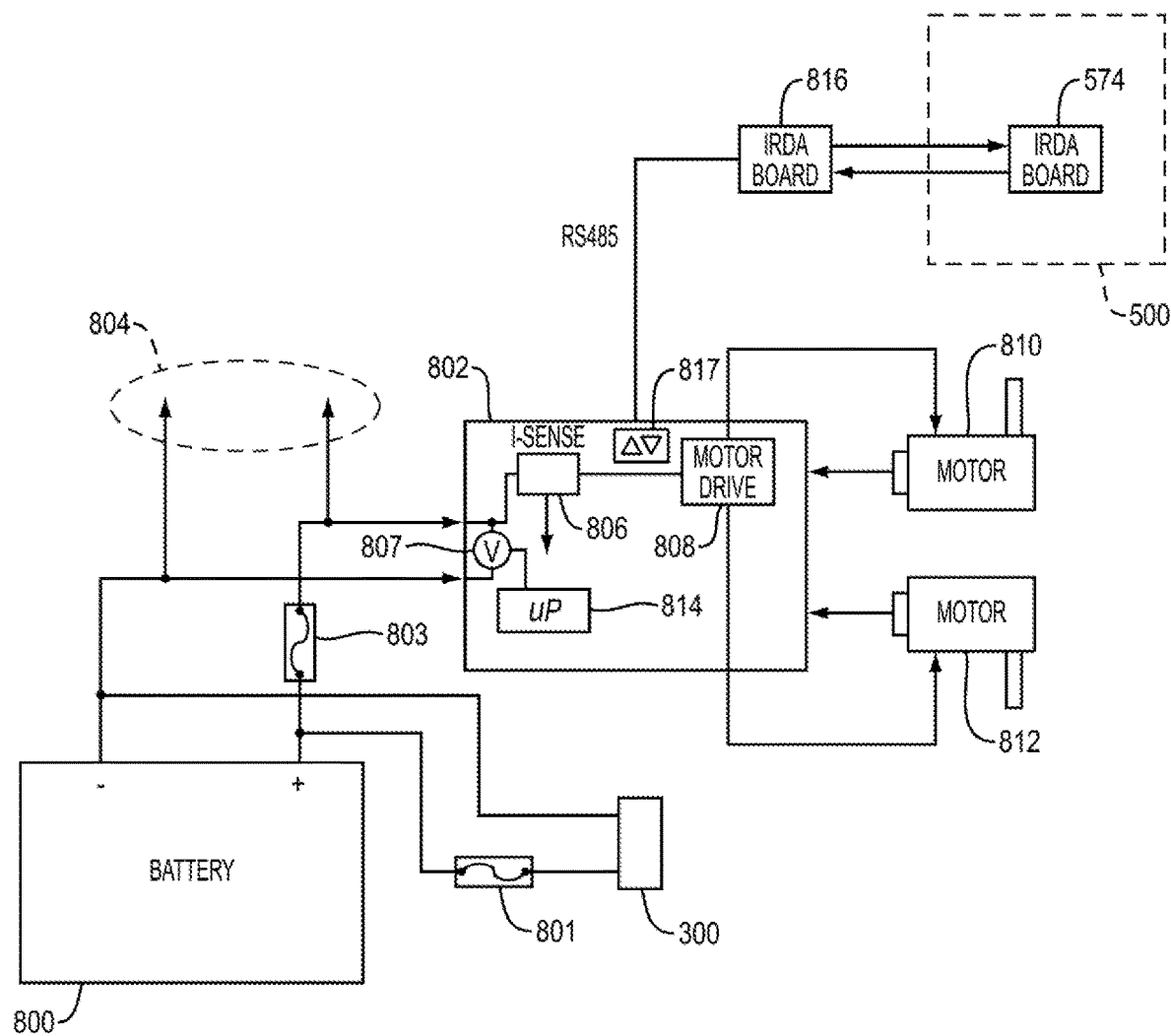
FIG. 20 is a schematic diagram of certain electrical components of the robot utilized in the robot charging process.

Referring to FIG. 20, the hardware components on the robot, such as robot 18 of FIGS. 17/18, pertaining to the charging system of this disclosure are shown. Battery pack 800, which may include, for example, two LiFePO4 (Lithium Iron Phosphate) batteries each having a 13.5V open-circuit voltage and 32 Ah capacity, is connected to electrical charging port 300 via fuse 801 on the positive terminal. The battery pack 800 is also connected to motor controller 802 via fuse 803 on the positive line from the battery and to DC to DC converters (not shown) via lines 804 to power various other components, such as robot controller, optical cameras, and Lidar.

It should be noted that the system herein does not require a battery pack with a full battery management system including circuitry to monitor battery charge state. The state of charge of the battery with the system herein is monitored using a distributed monitoring approach shared between the robot and the charging station which is described in detail below. As a result, a less expensive battery management system monitoring only safety related parameters such as voltage, temperature, and current is needed.

Motor controller 802 may include a current sensor 806, such as a hall sensor, in line with the positive connection of battery 800 and the motor drive circuit 808, which drives electric motors 810 and 812 to propel the robot. A voltage sensor 807 to measure the output voltage of battery 800 is may also be provided. There is a processor 814 on the motor controller 802, which among other things, controls the motor drive circuit 808 based on control signals received from the overall robot controller (not shown) and tracks the amount of current used by the battery to power electric motors 810 and 812 via the motor controller 802, as detected by current sensor 806. Processor 814 also uses the sensed current to determine the total charge usage by the measured current over time.

The amount of charge provided to the robot during charging by charging station 500 is determined by current sensor board 650, as described above. Also, as described above, IrDA board 574 on the charging station 500 allows for infrared communications between the charging station 500 and robot 18, which itself includes an IrDA board 816 connected to an RS 485 interface within motor controller 802. Periodically (e.g. once per second), the amount of charge transferred from the charging station to the robot may be communicated to robot 18 via infrared communications and saved in memory, which may be on the motor controller 802. When charging is completed, as described below, the starting or initial coulomb count will be known by the robot.

When the robot leaves the charging dock, the amount of charge used to power the electric motors and controller board, as described above, may be periodically determined (e.g. once per second) and then subtracted from the amount of charge provided during charging (initial coulomb count) to determine remaining charge (current coulomb count). This may be referred to as the state of charge ("SOC"). The robot determines when recharging is needed by comparing the SOC to a predetermined threshold level, as described above.

The amount of charge used by the electric motors 810 and 812 and controller board 802 is significantly greater than the amount of charged used to power the other components of the robot and thus may be used as the overall current usage for the robot or if greater precision is desired the current usage by the components other than the electric motors 810 and 812 may be measured and considered in the coulomb count.

Operation of the software and protocols for charging are described in the following section.

Robot Charging Software/Protocols

Figure 21:
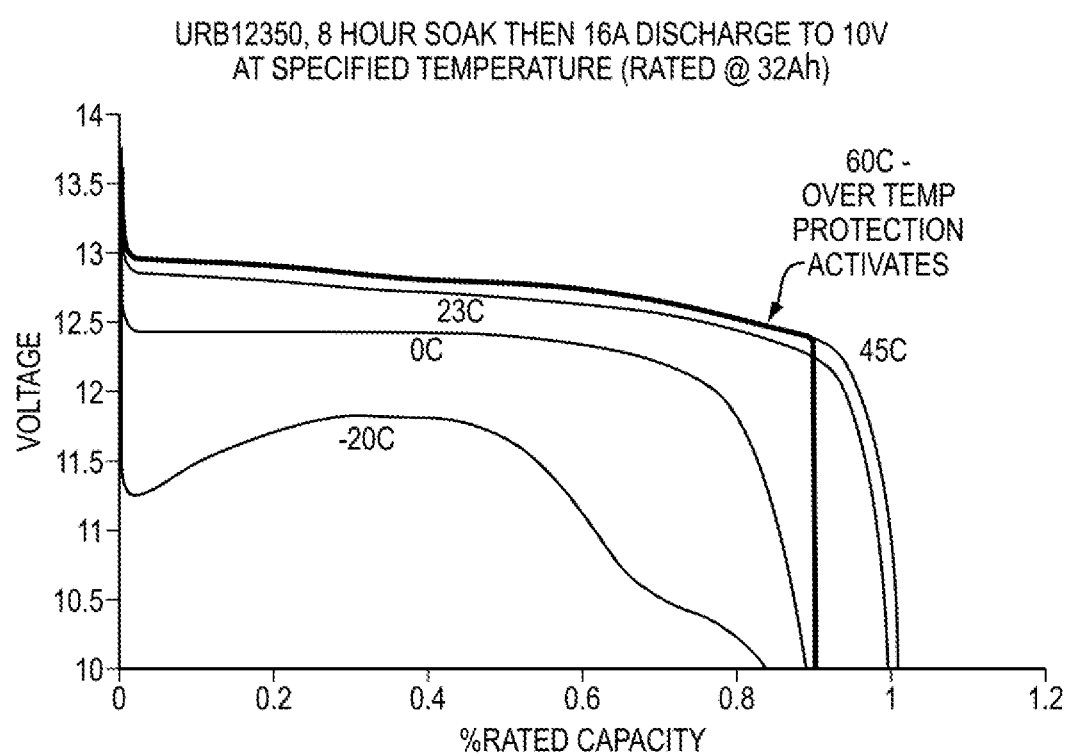
FIG. 21 is a graph of discharge profile of a robot battery at various temperatures.

The batteries used in the robots described herein will typically have a relatively flat current discharge vs. voltage curve. And, they may be highly temperature dependent. These characteristics are evidenced by the five curves shown for −20 C, 0 C, 23 C, 45 C, and 60 C illustrated in the graph of FIG. 21. The graph depicts the curves for one LiFePO4 (Lithium Iron Phosphate) battery having a 13.5V open-circuit voltage discharged by 16 A. As the battery is discharged, the battery voltage declines from approximately 13.5V to approximately 10V. On the right side of the graph, where battery has discharged a certain amount of capacity, the curves intersect the "X" axis, indicating 10V of potential remaining in the battery. The 23 C and 45 C curves discharge approximately 16 A. With the 60 C curve, the battery management system's over temperature protection activates and shuts down the battery after about 14.4 A have been discharged. At colder temperatures, namely, at 0 C and −20 C, all available energy cannot be removed from the battery and after discharging only about 14.4 A and 12.24 A, respectively, the battery stops functioning. As shown, the battery voltage remains fairly constant over a wide range of charge levels.

For example, at 23 C from just below fully charged to about a point where 14.4 A have been discharged the voltage varies only from 12.8V to just below 12.5V. As a result, the SOC cannot be reliably estimated from voltage alone. Thus, a reliable and accurate two-part algorithm may be used for the SOC estimation with the robot battery packs described herein.

The first aspect of the SOC algorithm utilizes a coulomb-counting (1 coulomb=1ampere*1 second) approach where current is accurately measured during both charging (by charging station 500 using current sensor 650, FIG. 19) and discharging (by the robot using current sensor 806, FIG. 20) of the batteries and integrating over time the measured current to determine total number of coulombs charged or discharged over a period of time. While charging, the integrated charge level is maintained in non-volatile storage on controller board 572 to maintain tracking over power-down periods. Also, while charging, the charge level is periodically communicated to the robot and saved in memory on, e.g., motor controller 802. When the robot leaves the charging station (i.e. the robot is undocked), the amount of current being discharged is monitored and from the original charge level, the current SOC can be determined.

Using coulomb counting alone, however, results tend to drift due to measurement error integrated over time To overcome this, there is a second aspect of the algorithm which uses full-charge/full-discharge thresholds. In other words, voltage level thresholds may be used by the robot to reliably detect full discharge and full charge states and these states can then be used for integrator reset to correct for drift of estimated charge. The robot will be responsible for maintaining the SOC estimate, for discharge coulomb-counting, and for detecting full charge and full discharge states. The charger will be responsible for coulomb-counting during charging.

Referring again to FIG. 21, as the battery gets charged (moving right to left along the graph for a given temperature), eventually the voltage will rise to a predetermined upper voltage threshold, which in this case may be approximately 14.3V (per battery). The robot uses this upper threshold as a way of determining that the battery is fully charged. It knows its SOC by determining the most recently stored coulomb count in memory when the threshold voltage level is reached. The robot may then depart the charging station and begin the coulomb counting process to determine the amount of charge being used.

While the robot described herein uses a process to maintain an accurate estimate of battery pack capacity and the intention is that it will reach a charging station autonomously prior to the battery reaching a fully discharged state, the system is designed to recover robots which have reached such a fully discharged battery state before docking at a charging station. As the battery is discharged (moving left to right along the graph), if the voltage drops to a lower threshold voltage level, e.g. 9 V (per battery), this lower threshold may be used to indicate that the battery is fully discharged. At this lower threshold voltage level, the robot is automatically powered down to avoid damaging the battery. A manual restart of the robot would be needed after the robot is moved to a docking station and provided with a recovery charge, as described below. When the battery packs drop to a certain low voltage level (e.g. 8V per battery) they will typically trigger an internal protective shut down and the battery will no longer take a charge. To prevent this terminal condition from being triggered, the robot may be configured to power down at the predetermined low voltage threshold (e.g. 9V each battery), which is above the terminal voltage level.

Note that the full discharge condition may only occur occasionally. This is because the robot may be programmed to return to a charging station for recharging at a predetermined SOC, which would be known to be above the full discharge level. In other words, there typically will be set a SOC level above the point of a full discharge (e.g. 10-20% above full discharge level). When such a level is reached, the robot will travel to a charging station for recharging. Once the robot knows that it must be recharged, it may determine the nearest available charging station. Robots operating in the space and/or the warehouse management system will coordinate at a higher level to ensure that only one robot will attempt to dock with a particular charging station at a time. As described above, each charging station will have a unique identifier and a pose associated with it. The robot will navigate to the pose of the selected charging station and begin the docking process, both processes are described above in detail.

The robot may use the number of full charges/discharges to provide the system operator with an end-of-life warning for the packs. These statistics are written to nonvolatile storage (flash) on power-down and read from nonvolatile storage (flash) on power-up. For example, when a certain number of full charge and/or discharge states are reached, the robot may indicate that factory servicing of the battery is required. Also the SOC at given voltage levels may be monitored to determine if the battery is no longer sufficiently holding a charge, in which case the robot may also indicate that factory servicing of the battery is required.

When a robot arrives at a charging station and is docked, communications will be established between the robot and the charging station by the IrDA boards 574 and 816, respectively, and the charging process will begin. Successful docking may be confirmed and indicated when the battery voltage is sensed by the charging station controller 572, FIG. 19, to be greater than a threshold value (with hysteresis) across the electrical charging assembly 200. With Battery pack 800, FIG. 20, described herein the threshold voltage level may be 18V with 1V hysteresis (2 batteries*9V). The detected voltage level may be communicated to the robot via IrDA communications and the robot may confirm that the voltage readings received are in agreement with the robot internal voltage measurement within some tolerance level.

After communications are established and the threshold voltage level is confirmed, the charging process will not be enabled unless a short circuit condition is not detected and the battery temperature (detected by the robot and supplied to the charging station via IrDA) is within an acceptable range. For battery pack 800, the temperature range may be above 0 C and below 45 C degrees. An indication of battery type on the robot (either robot type or battery type or some other indicator) may be communicated via IrDA communications to the charging station and from the battery type, a specific charging profile may be selected. At the start of charging, coulomb counting is initialized and the charging process begins according to the selected charging profile.

The charging process according to a charging profile for one particular battery type is described with regard to Table 1 below and flow chart 850, FIG. 22. Also, depicted in the Table 1 are the parameters for a generic battery recovery for a fully discharged battery. As indicated in the Table 1, the charging profile for the given battery has different parameters used in different circumstances. For normal or fast charging there is a set of charging parameters which differ from the parameters for extreme temperatures (hot or cold outside of specific ranges).

The recovery mode parameters are used when a robot is manually docked after being fully discharged and a manual recovery switch has been pressed to start charging. In other words, these parameters would be used to initially charge any type of robot battery sufficiently until the robot can be restarted and IrDA communications can be re-established.

In the case of a full discharge battery recovery, since the robot will no longer turn on, IrDA communications cannot be established and the charging station will not know the battery type of the robot. Once an operator has manually docked the robot to the charging station, a manual start pushbutton on the charging station will be pressed and held. A generic initial charging profile is instituted by outputting a low charge current until a threshold battery voltage is reached, at which time an indication is given to the operator to turn on the robot. Once turned on, the IrDA communications are established and the normal autonomous charging process is initiated.

TABLE 1

| Charging Profile Name | Precharge Current/ Recovery | Termination Voltage/ Recovery | Charge Current for Constant Current Phase | Charge Voltage for Constant Voltage Phase | Termination Current for Constant Voltage Phase | Voltage for Post-Charge Float Phase to Power Robot Until Undocked |
|---|---|---|---|---|---|---|
| Fast | 5.0 A | 25.50 V | 34.0 A | 28.6 V | 1.25 A | 27.2 V |
| Extreme Temperature | 3.0 A | 25.50 V | 20.0 A | 28.6 V | 1.25 A | 27.2 V |
| Recovery | 2.0 A | 25.50 V | 20.0 A | 28.6 V | 0.50 A | 0.0 V |

Figure 22:
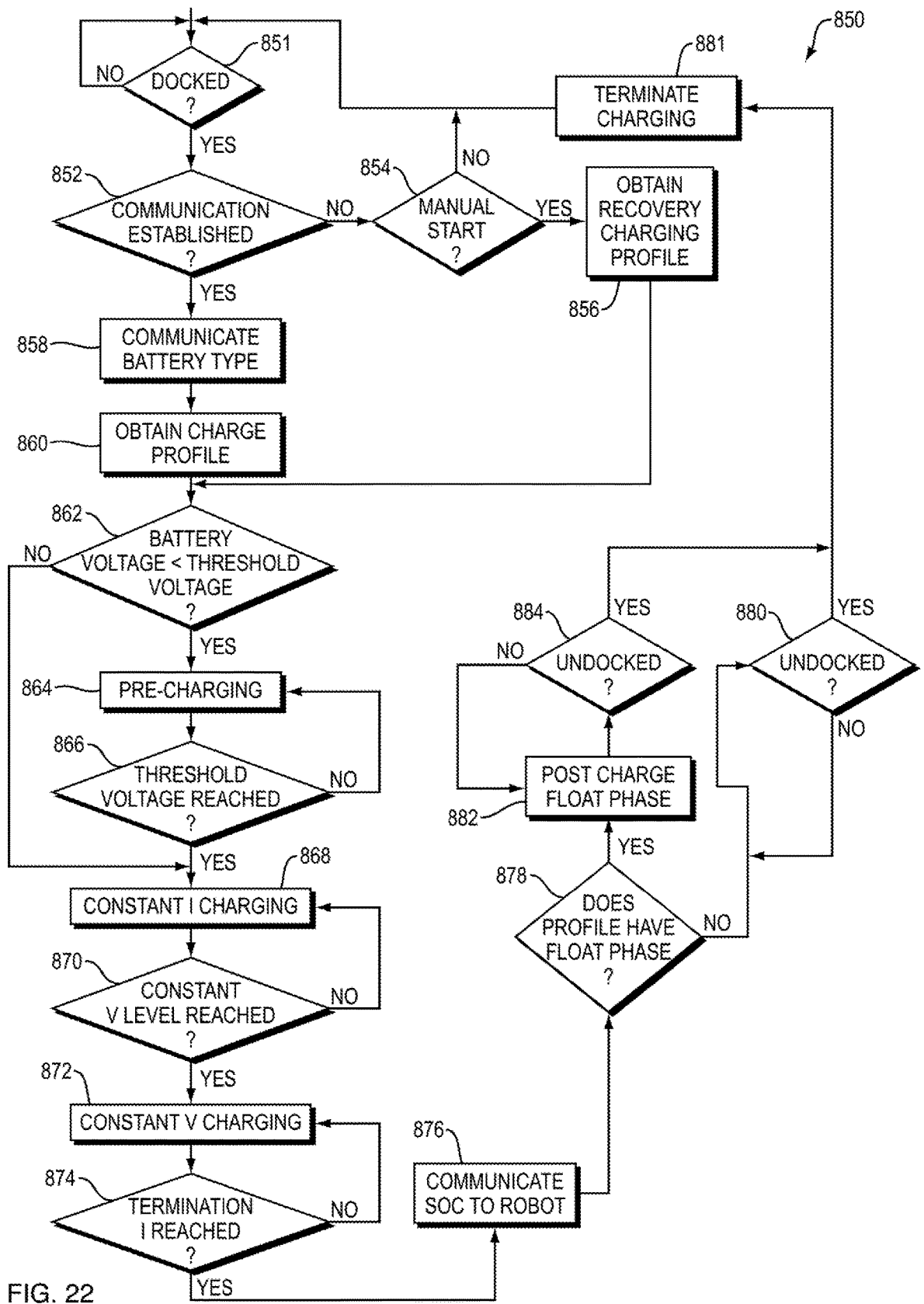
FIG. 22 is a flow chart depicting the robot charging process according to an aspect of the invention.

Referring to flow chart 850, FIG. 22, at step 851 the charger determines if a robot is docked by checking for a voltage sensed at the charger. If a robot is docked, at step 852, the charging station determines if IrDA communications with a docked robot have been established. If IrDA communications have not been established, at step 854, it is determined if the manual start button has been pressed to initiate a manual charging process of a robot with a fully discharged battery. If the manual start button has been pressed, the recovery charge profile is obtained and the system proceeds to step 862. If in step 852, communications are established with the robot, the system proceeds to step 858 where the battery type or robot type and battery condition (i.e. temperature) of the docked robot is communicated to the charging station. From the battery/robot type and battery condition, the particular charging profile for the battery is recovered from memory in step 860 and the system then proceeds to step 862.

At step 862 it is determined if the battery voltage is less than the threshold voltage, which in the charging profiles (fast, extreme temperature, and recovery) of Table 1 is 25.5V. If the battery voltage is not below the threshold voltage the system proceeds to step 868. If the voltage is below the threshold voltage, at step 864, pre-charging is undertaken at a constant current as set forth in Table 1. The particular pre-charge current will be dependent upon the charging profile being used. Thus, for the example in Table 1, the fast charging the pre-charging current is 5.0 A, for extreme temperature the pre-charging current is 3.0 A, and for recovery the pre-charging current is 2.0 A. While pre-charging, the voltage at the charger terminal is being checked at step 866 to determine if the threshold voltage has been reached. If it has been reached the system proceeds to step 868 and if not pre-charging continues until the threshold voltage is reached.

At step 868, the main charging process begins with a constant current charging stage using the current selected from the particular charging profile being used. In the example of Table 1, for fast charging, the charging current is set at 34 A, while for extreme temperature charging as well as recovery charging, the charging current is set at 20 A. In each case, this continues until at step 870 a predetermined voltage level is attained. In the example of Table 1, the predetermined voltage level for fast, extreme temperature and recovery charging is 28.6V. Once this voltage level is reached, at step 872, a fixed voltage charging stage is undertaken, with the charging voltage maintained at 28.6V charging continues until a termination current is reached, as determined by step 874. The termination current for the fast and extreme temperature charging profiles in Table 1 is 1.25 A and for the recovery charging profile it is 0.5 A. Such a low level of charge current being supplied at the constant voltage is indicative that the robot is nearly at full charge, so the charger station terminates the main charging process.

The system proceeds to step 876 where the SOC is communicated to the robot. While not specifically shown in flow chart 850, during the pre-charging and main charging processes, the SOC may be communicated to the robot regularly, e.g. once per second. At this point the robot may undock from the charging station, however, that is under the control of the robot. As described above, during charging, the battery voltage is monitored and it will eventually rise to a predetermined upper voltage threshold, e.g. 14.3V (per battery). The robot uses this upper threshold as a way of determining when the battery is fully charged. It uses the SOC most recently stored in memory when the upper voltage threshold is reached as its initial coulomb count if it decides to undock at that point. In certain situations, the robot may remain docked event though it is fully charged. One reason for the robot to remain at the charging station may be due to receiving a command from the warehouse management system to remain at the charging station if it is not needed on the floor. If the robot were to remain at the charging station after the main charging process is completed it would lose its charge over time. Therefore, a float charge process may be instituted to maintain the charge of the robot.

At step 878, it is determined if the charging profile includes a float charge phase. If it does not, the system proceeds to step 880, where it is determined if the robot has undocked. If it has not, the system cycles back to step 880 until the robot has undocked and then the system proceeds to step 881 where charging by the charging station is terminated. The system then proceeds to step 851 and waits for the next robot to dock for charging. When the robot departs the charging station it begins the coulomb counting process to determine the amount of charge being used.

If at step 878, it is determined that the charging profile includes a float charge phase, at step 882 a float phase is instituted. In the float phase, the charging voltage of the charging station is fixed at float phase voltage level while a "trickle charge" is input the robot. In the example of Table 1, for the fast and extreme temperature profiles, the float phase voltage may be 27.7V. The resulting trickle charge may be approximately 0.2 A. During the float phase, the charger is supplying a standby current which is consumed by the robot (assuming the robot is turned on). Robot standby current consumption is approximately 0.2 A (200 mA), but is not regulated by the charger. This continues until the robot undocks as determined at step 884. When the robot undocks the system proceeds to step 881 where charging by the charging station is terminated. The system then proceeds to step 851 and waits for the next robot to dock for charging. And, when the robot departs the charging station it begins the coulomb counting process to determine the amount of charge being used.

Although not depicted in flow chart 850, there are several events that can occur during the charging process that require the process to be terminated. This includes a short circuit condition which can be detected by estimating load resistance based on the ratio of current over voltage. If this is below a threshold value, e.g. 50M Ohm, the charging station may determine that a short circuit has been detected and terminate the charging process. Additionally, if an open or resistive circuit (greater that a threshold, e.g. 1 Ohm) is detected the charging process may also be terminated to prevent overheating. If IrDA communications are lost or other important conditions are detected the charging process may be terminated. As described above, the integrated charge level is maintained in non-volatile storage on controller board 572 to ensure accurate charge tracking during power-down periods.

Figure 23:
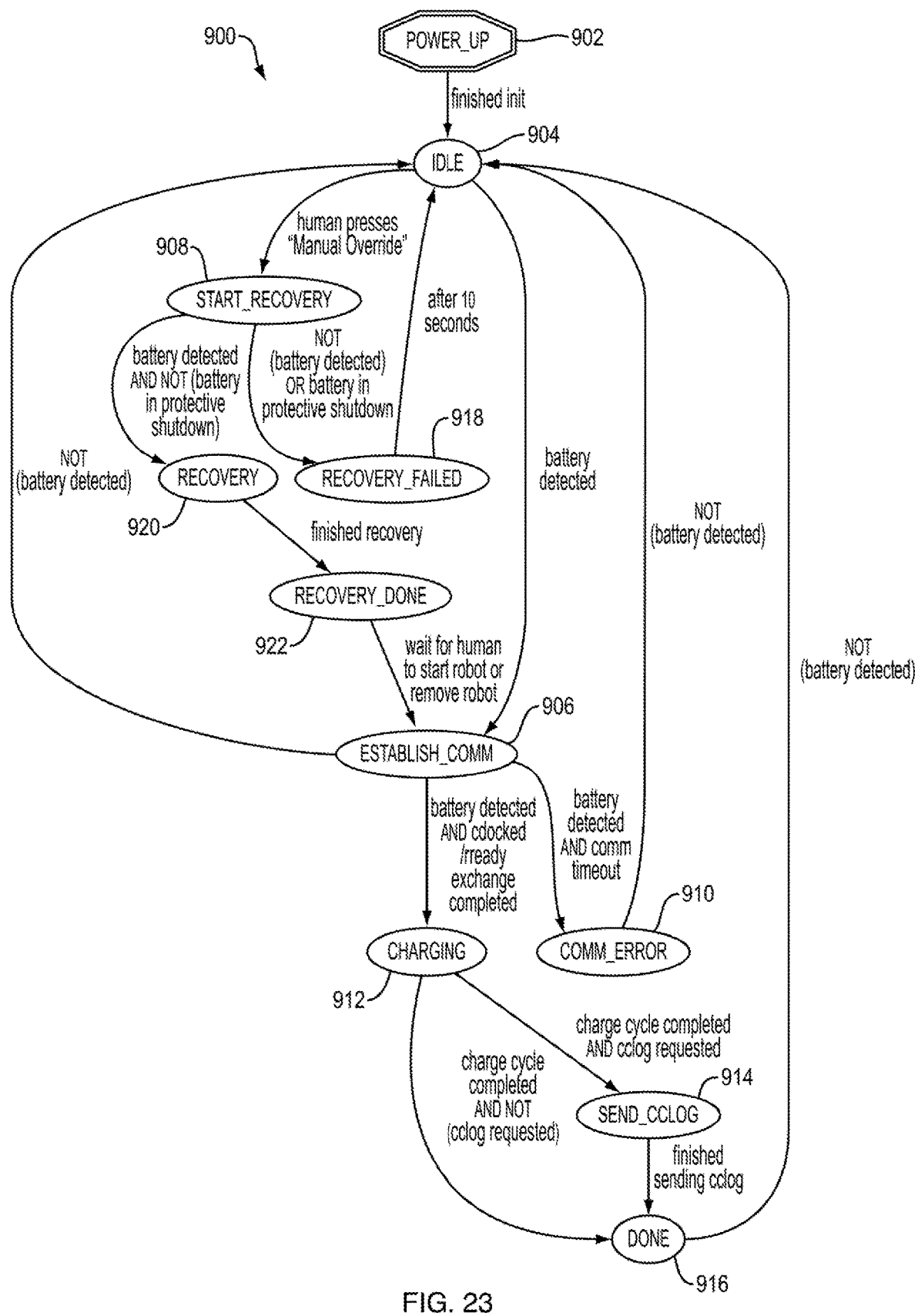
FIG. 23 is a state diagram depicting the operation of the charging station according to an aspect of this invention.

The higher level operation of charging station 500 is depicted in state machine 900 of FIG. 23. The charging station 500 is powered up and initialized at state 902. Once initialization is complete, the charging station enters an idle mode at state 904 and waits for either a battery to be detected (robot ready for automatic charging) or a manual override input to be detected (button pressed by operator to enter the manual charging mode for a robot with a "dead" battery). If a battery is detected the system proceeds to state 906 where communications between the robot and the charging station are established. If a manual override input is detected the system proceeds to start recovery state 908.

In the automatic charge process, if communications with the robot are not established at state 906, a communication error is determined at state 910 and the system returns to the idle state 904. If communications are established at state 906 the charging process begins at state 912 as described above. At the completion of charging, if the robot request a charge cycle log (CCLOG), at step 914, the charging station sends to the robot the CCLOG and terminates the charging process at state 916. If the robot does not request the CCLOG, the system simply proceeds from charging state 912 to the done state 916. In either case, the robot then returns to the idle state 904.

If instead, the manual override input is detected, at state 908 the manual recovery process begins. If a battery is not detected or battery is in protective shutdown mode, the system enters the recovery failed state 918 and then returns to the idle state 904. If in start recovery state 908 the battery is detected and the battery is not in protective shutdown, the recovery process as described above is undertaken in state 920. When the recovery process is completed at state 922, the system proceeds to establish communications with the robot at state 906 and undertake the automatic charging process.

While not shown in state machine 900, there are several events that can occur during the charging process that require the process to be terminated, for example, a short circuit or open circuit, or if the robot leaves the charging station before charging is complete.

While the foregoing description of the invention enables one of ordinary skill to make and use what is considered presently to be the best mode thereof, those of ordinary skill will understand and appreciate the existence of variations, combinations, and equivalents of the specific embodiments and examples herein. The above-described embodiments of the present invention are intended to be examples only. Alterations, modifications and variations may be effected to the particular embodiments by those of skill in the art without departing from the scope of the invention, which is defined solely by the claims appended hereto. The invention is therefore not limited by the above described embodiments and examples.

We claim:

1. An electrical charging station for charging an autonomous robot having a battery, comprising:
   a first charging member on the electrical charging station configured to receive a second charging member on the autonomous robot when the autonomous robot is docked with the charging station for charging;
   a communications device configured to receive from the autonomous robot an identifier indicative of a type of battery on the autonomous robot;
   a power supply, electrically connected to the first charging member, configured to charge the autonomous robot according to a charging profile; wherein the charging profile is selected based at least in part on the identifier received from the autonomous robot;
   a processor configured to control the power supply to charge the autonomous robot according to the charging profile and to provide the autonomous robot with a state of charge (SOC) periodically during charging;
   wherein the processor is configured to terminate charging when an upper battery voltage threshold has been reached or when a predetermined current level is being output by the power supply, in both cases indicating a fully charged battery, and wherein a last SOC provided to the robot by the processor before terminating charging is used by the autonomous robot as the SOC when the autonomous undocks the charging station.

2. The electrical charging station of claim 1 wherein the identifier comprises one or more of a battery type, an autonomous robot type, or battery condition.

3. The electrical charging station of claim 2 wherein the battery condition includes a battery temperature and wherein for a certain battery type the charging profile for a normal battery temperature range is different than the charging profile for either a battery temperature above the normal temperature range or below the normal temperature range.

4. The electrical charging station of claim 2 wherein the charging station includes a memory for storing a plurality of charging profiles, at least one of which corresponds to the identifier.

5. The electrical charging station of claim 4 wherein the communications device includes a transceiver for communicating with a corresponding transceiver on the autonomous robot.

6. The electrical charging station of claim 5 wherein the transceiver of the charging station and the corresponding transceiver on the autonomous robot are optical transceivers and communicate using an IrDA communications protocol.

7. The electrical charging station of claim 6 further including a current sensor configured to sense a current output from the power supply to the autonomous robot and a voltage sensor configured to sense a voltage across the first charging member applied by the power supply.

8. The electrical charging station of claim 7, wherein the charging profile includes a constant current portion and a constant voltage portion.

9. The electrical charging station of claim 8 wherein the processor is configured to charge the robot in the constant current charging portion of the charging profile using a constant current until a predetermined voltage level is reached and to then charge the robot in the constant voltage portion of the charging profile using a constant voltage.

10. The electrical charging station of claim 9 wherein the processor is configured to control the power supply after the robot is fully charged but before the robot has undocked from the charging station to charge the robot using a float charging profile which provides a limited charge level to the robot by maintaining a constant voltage level until the robot is undocked.

11. The electrical charging station of claim 9 wherein the processor is configured to charge the robot in a dead battery state using a recovery profile having a constant current portion and a constant voltage portion, and wherein the processor is further configured to prompt a user to start the robot upon completion of the recovery charging profile so that communication between the robot and the charging station can be established to complete robot charging using a charging profile selected based at least in part on the identifier received from the autonomous robot.

12. A method for charging an autonomous robot having a battery, comprising:
    docking an autonomous robot by mating a first charging member on an electrical charging station with a second charging member on the autonomous robot;
    receiving a communication from the autonomous robot including an identifier indicative of a type of battery on the autonomous robot;
    charging, using a power supply, a battery of the autonomous robot according to a charging profile; wherein the charging profile is selected based at least in part on the identifier received from the autonomous robot;
    providing the autonomous robot with a state of charge (SOC) periodically during charging;
    terminating charging when an upper battery voltage threshold has been reached or when a predetermined current level is being output by the power supply, in both cases indicating a fully charged battery; and
    using a last SOC provided to the autonomous robot before terminating charging as the SOC when the autonomous undocks the electrical charging station.

13. The method of claim 12 wherein the identifier comprises one or more of a battery type, an autonomous robot type, or battery condition.

14. The method of claim 13 wherein the battery condition includes a battery temperature and wherein for a certain battery type the charging profile for a normal battery temperature range is different than the charging profile for either a battery temperature above the normal temperature range or below the normal temperature range.

15. The method of claim 13 wherein the method further includes storing in a memory in the charging station a plurality of charging profiles, at least one of which corresponds to the identifier.

16. The method of claim 15 wherein the receiving step includes communicating with optical transceivers one on each of the autonomous robot and on the charging station using an IrDA communications protocol.

17. The method of claim 16 further including sensing a current output from the power supply to the autonomous robot using a current sensor and sensing a voltage across the first charging member applied by the power supply using a voltage sensor.

18. The method of claim 17 wherein the charging profile includes a constant current portion and a constant voltage portion.

19. The method of claim 18 further including charging the robot in the constant current charging portion of the charging profile using a constant current until a predetermined voltage level is reached and charging the robot in the constant voltage portion of the charging profile using a constant voltage until a predetermined current level is reached.

20. The method of claim 19 further including controlling the power supply after the robot is fully charged but before the robot has undocked from the charging station to charge the robot using a float charging profile which provides a limited charge level to the robot by maintaining a constant voltage level until the robot is undocked.

21. The method of claim 19 further including charging the robot in a dead battery state using a recovery profile having a constant current portion and a constant voltage portion, and prompting a user to start the robot upon completion of the recovery charging profile so that communication between the robot and the charging station can be established to complete robot charging using a charging profile selected based at least in part on the identifier received from the autonomous robot.

* * * * *